INVENTORS.
John M. Walter.
Graham E. Marx.
BY Wood, Herron & Evans.
ATTORNEYS.

INVENTORS.
John M. Walter.
BY Graham E. Mary.
Wood, Herron & Evans.
ATTORNEYS.

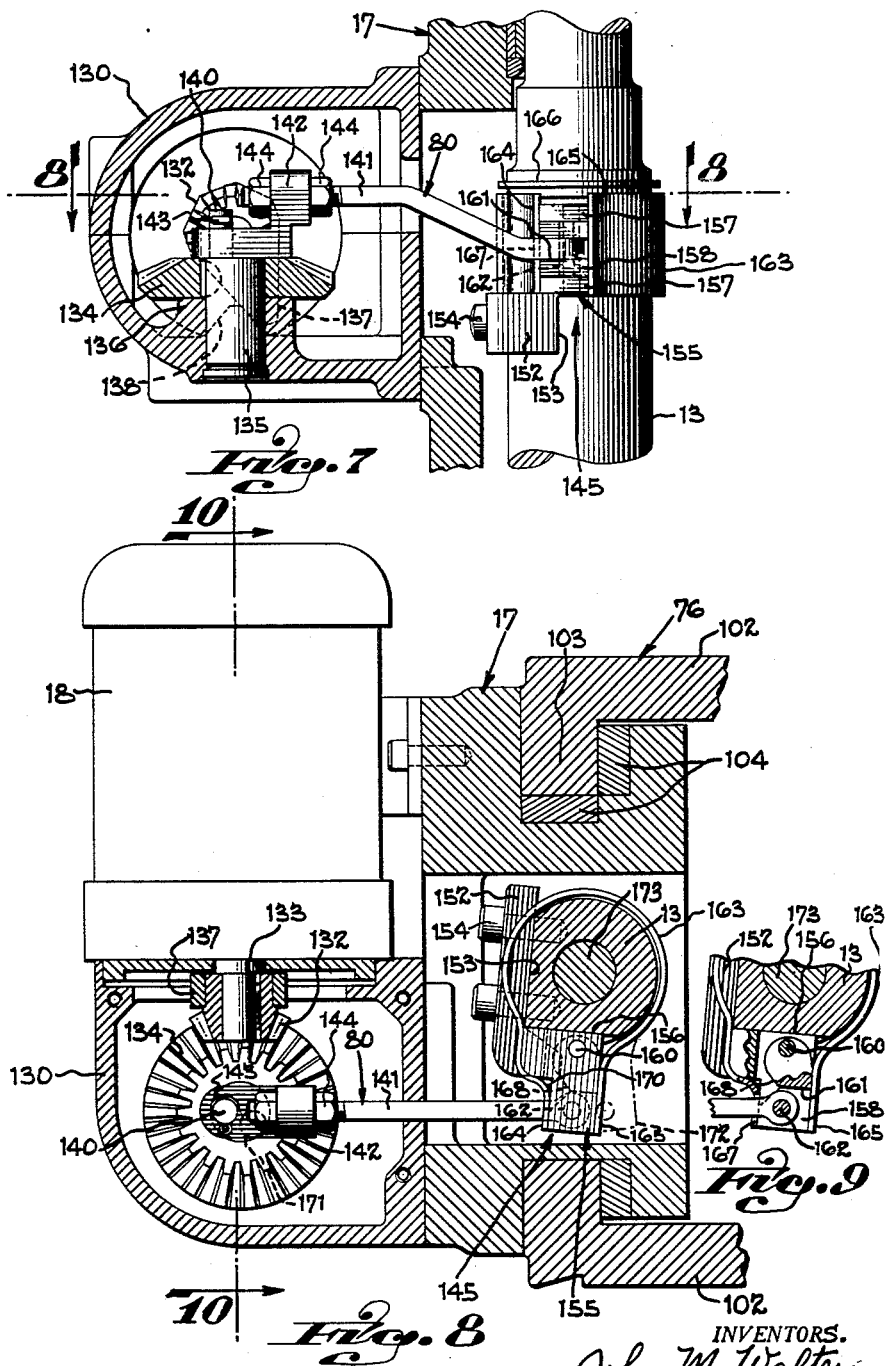

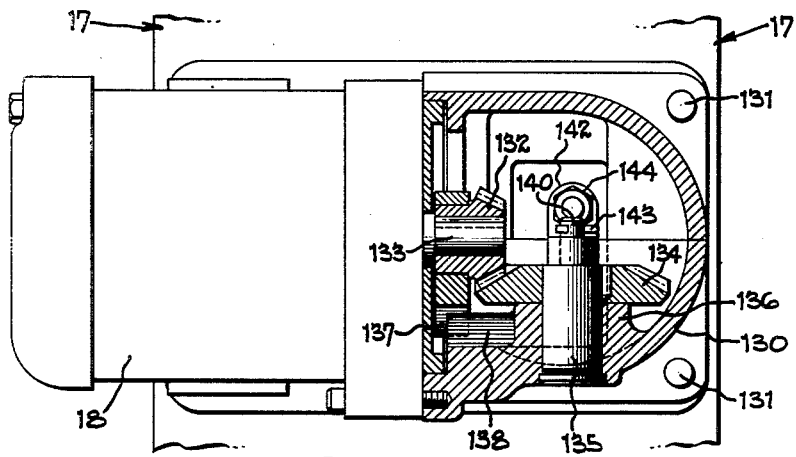
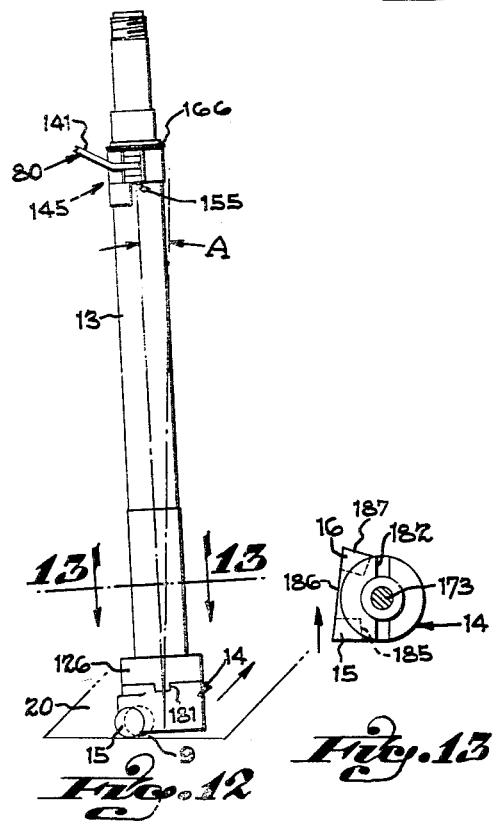
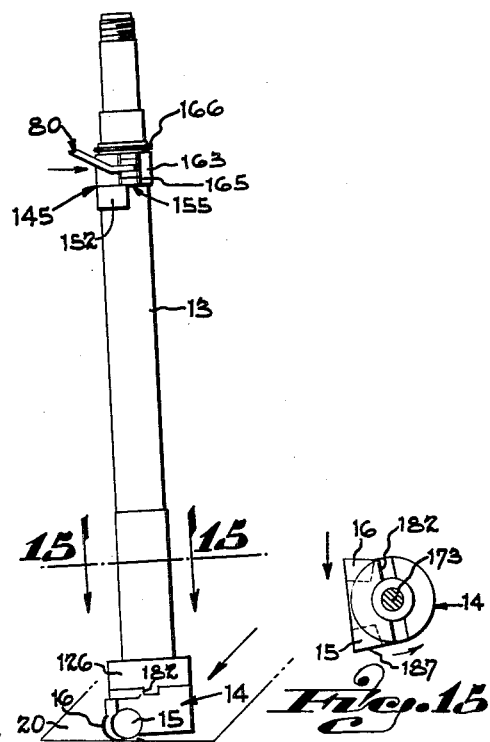

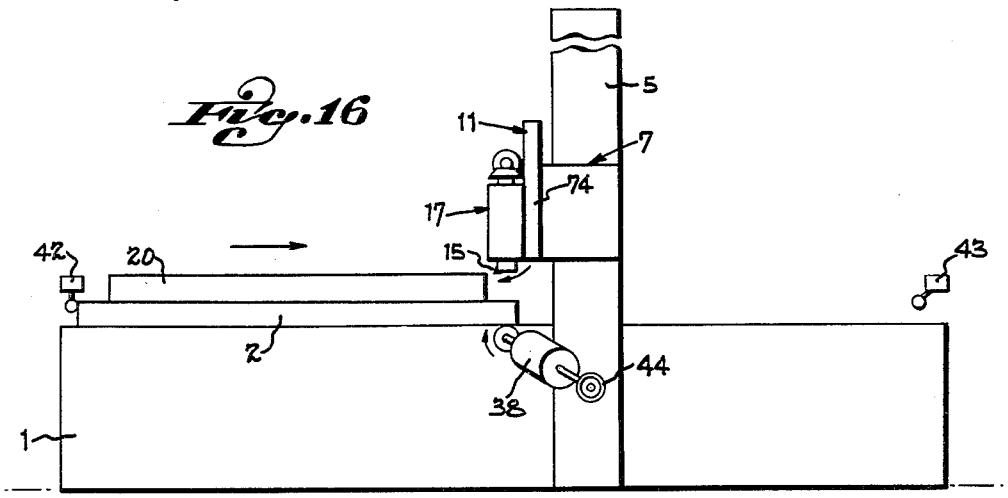
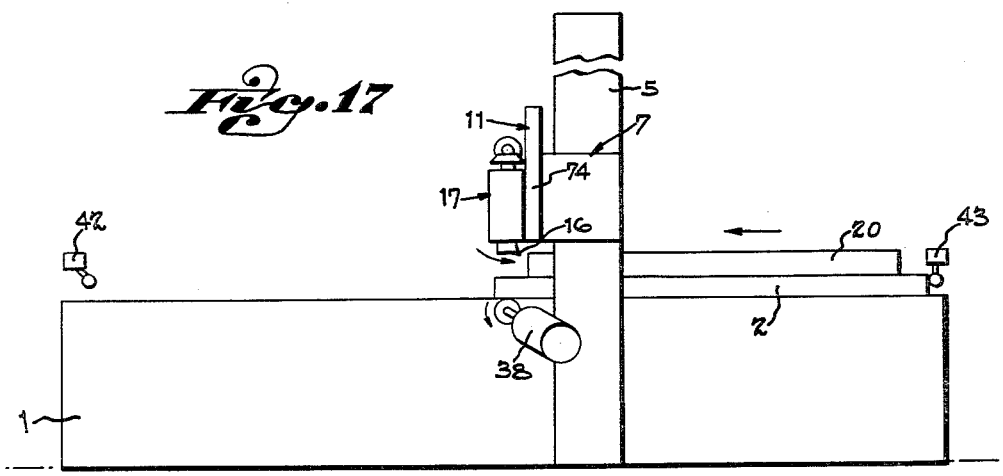
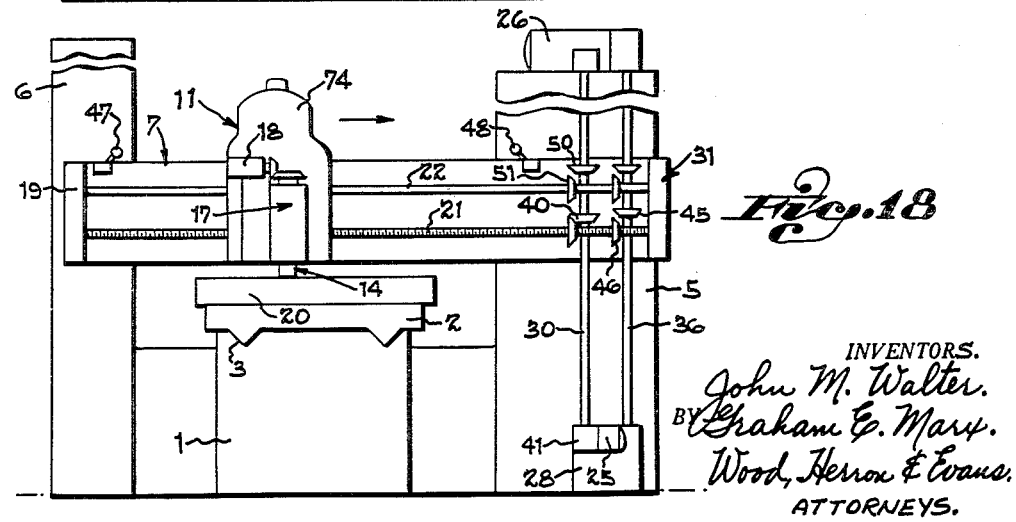

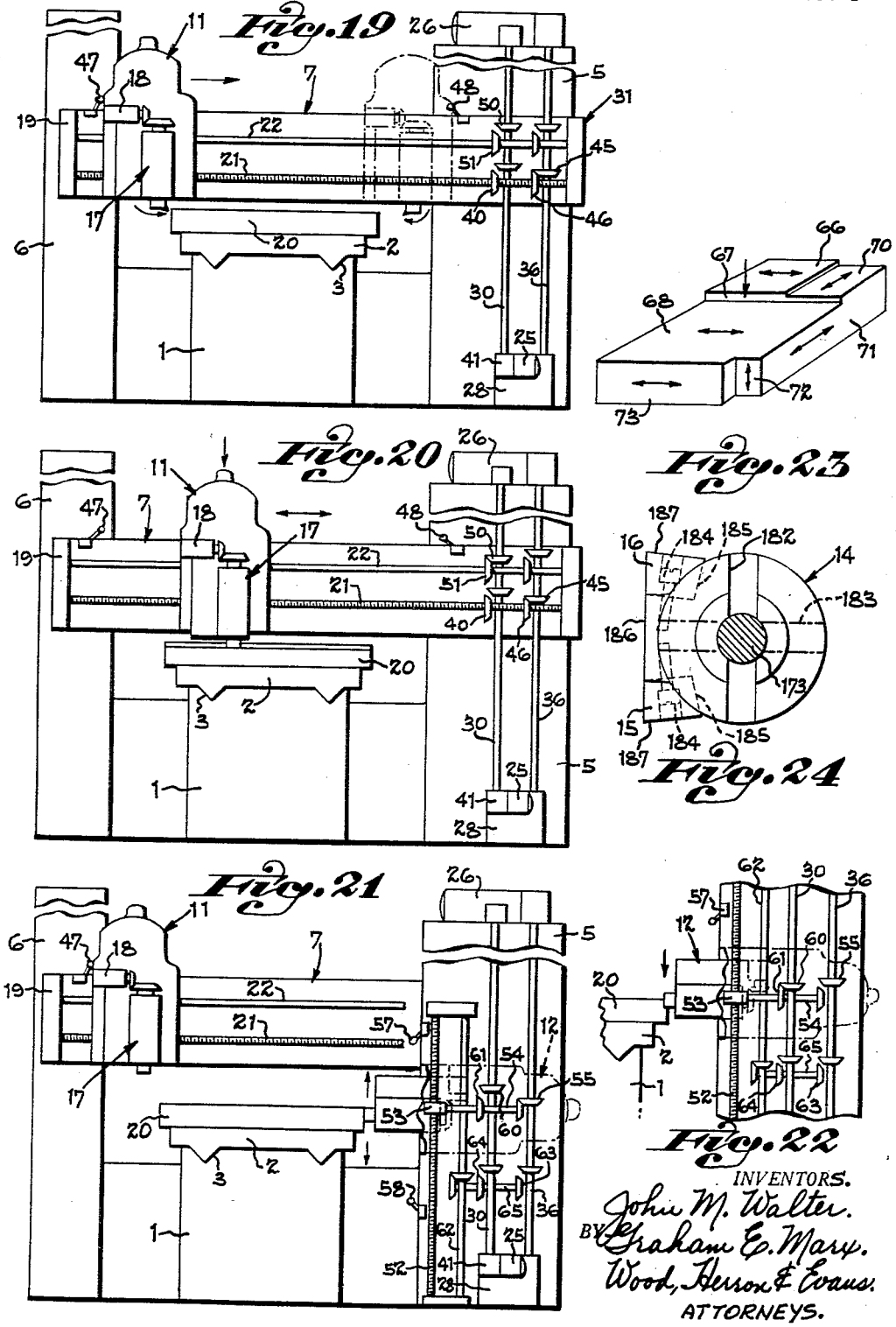

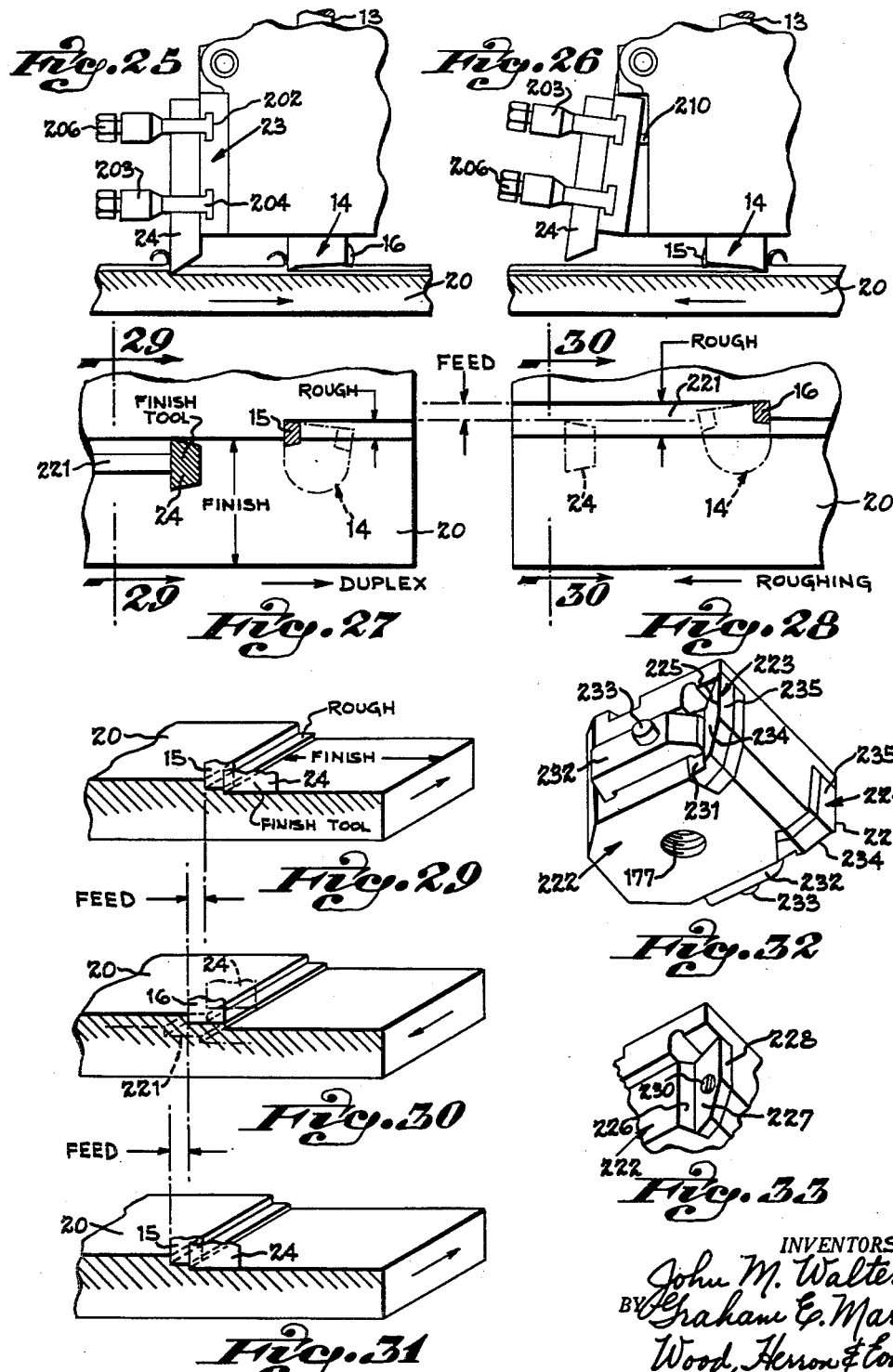

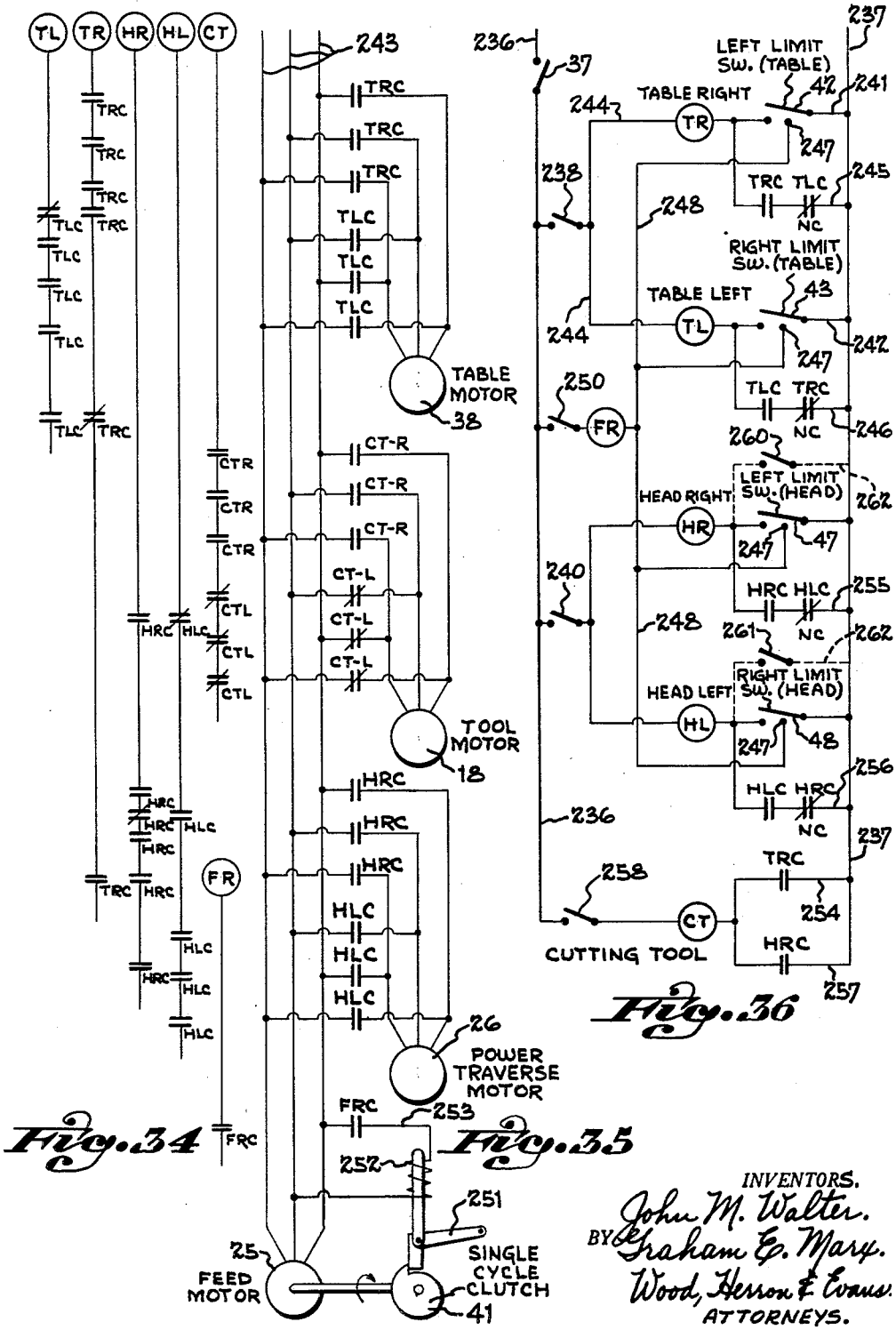

United States Patent Office 2,940,368
Patented June 14, 1960

2,940,368

MACHINE TOOL

John M. Walter and Graham E. Marx, Cincinnati, Ohio, assignors to The G. A. Gray Company, Cincinnati, Ohio, a corporation of Ohio Filed May 10, 1955, Ser. No. 507,207

10 Claims. (Cl. 90—34)

This invention relates to a machine tool for planing surfaces of work pieces. It is directed particularly to an improved construction whereby a planing action may be effected during movement of the table in either or both directions of movement thereof, and also whereby planing action may be effected in either or both directions crosswise of the table.

The typical metal-working planer comprises an elongated bed upon which a table is slideable under power drive. Vertical frame elements at one or both sides of the bed support a cross rail or arm extending over the table upon which a saddle is slideable under power drive. A compound tool supporting head, usually pivotally mounted, is supported upon the saddle to carry a rigid single-edged cutting tool. The bed is approximately twice as long as the table and the table is arranged to be reciprocated automatically upon the bed. In operation of the conventional planer, the work piece fastened on the table is carried past the tool whereby a cut is taken, then the table movement is reversed, the tool is fed to a position for a second cut, and the operation is repeated. By the repetition of such cuts, a planed surface is produced. The type of tool, the amount of speed and feed, and other factors govern the quality of the finish.

In modern planer construction, and with the use of sintered carbide tools, the speed of travel of the table during the cutting stroke is much greater than it used to be. Also, the rate of table return following each cutting stroke is very high in order that the total time to complete a given planing operation will be reduced and in order that the ratio between the time during which cutting action takes place and the total time may be as high as possible. However, return traverse of the table following each cutting stroke inherently constitutes wasted time which impairs the efficiency of the operation.

Various devices have been proposed to enable cutting upon work pieces during both the forward and the return strokes of the table so as to eliminate the wasted time allocated to the return strokes of the conventional type of machine. However, such constructions have either prevented usage of the planer in a conventional manner, as is requisite for certain types of work, or they have been offered as attachments for a conventional planer. Such attachments, if light enough in weight to be mounted and demounted conveniently, have not been sufficiently rigid to provide first-class work, or, if heavy enough to serve the latter need, have been too cumbrous to be mounted conveniently on the machine when desired for use. Some of the linear surfaces produced upon a planer require operation of the machine in a conventional way with a single edge tool, and therefore, it has been impractical to build planers of the double acting type as special purpose machines to serve that function only.

The principal objective of this invention has been to provide a planer which is adapted for service as a double action planer, through which cutting action may be effected in both directions of table movement, or as a single action planer for effecting cuts in one direction only of the table travel, or as a duplex machine wherein double-cutting action may be conducted in unison with a single edge tool for simultaneously finishing, or supplementally cutting on the surface in conjunction with the double acting tool.

A further objective of the invention has been to provide a planer adapted for selectively exerting a cutting action on a work piece in either or both directions of moevment of the tool crosswise of the table. Normally, the working or cutting stroke of a planer is in a direction longitudinal of the table and crosswise movement of the tool over the table is employed for feed purposes only. If a surface is to be machined in a crosswise direction of the work piece, then the work piece is unfastened from the table, turned through 90°, and refastened so that the machining of that surface may be completed. The present invention, however, contemplates a machine in which single or double cutting may be accomplished during movement of the table on a bed in both directions or either one as desired, and wherein crosswise cutting may be conducted on the work piece, without removing it from the table, by traversing a double cutting tool across the table and by cutting in either or both directions of such crosswise movement.

A further objective of the invention has been to provide these movements in a machine which displays the full rigidity of a modern single acting planer, whether used for double or for single action cutting.

In substance, therefore, the principal objective has been to provide a planer in which the time normally lost while awaiting return of the table or tool is eliminated, and in which all of the various types of work that can be accomplished on a single action planer may be accomplished in less time and with a greater degree of accuracy and convenience.

The machine of the present invention may embody conventional bed, table, frame, cross rail, and saddle elements. The machine also comprises a conventional type of compound head, equipped with a single edge tool mounted in the usual clapper box and suitably swivelled for cutting V's, rails, and shapes of similar cross-sectional configuration. However, machines of the present invention embody a double cutter support element which is rotatably mounted in the compound head and a double cutting tool is mounted on this member beyond or beneath the conventional head. The double acting tool carries two generally opposite facing elements, each one being out of the cutting path when the other is in cutting position. A suitable power mechanism is employed to oscillate or rock the double acting tool at each end of the cutting stroke, whether it be longitudinal or crosswise of the table, so that the tools alternately are brought into cutting position.

By this construction, the same relative degree of rigidity is provided for the support of the double acting tool as for the support of a tool mounted in the normal tool head of the apparatus. Therefore, the weakness which is inherent in any type of double cutting attachment of handleable size is avoided. The location of the double acting tool of the present invention beyond or below, but closely adjacent, the cutting site of a conventional single edge tool mounted in the conventional tool post eliminates the interference of the double cutting elements with the use of the machine for single edge cutting purposes, and both may be used for cutting at the same time when desired. For example, in a representative operation of this type, a relatively wide single edge tool, such as a finishing tool, may be mounted in the conventional tool post, its point being set with respect to the points of the double action cutters so that it will skim-cut the surface previously imparted to the work piece by the respective double action cutters as all are relatively fed in serial order over the work piece.

For longitudinal double action cutting, the double acting bits are positioned to face in opposite directions generally longitudinal of the table, the cutting edges, of course, being disposed at appropriate rake angles. However, by positioning the cutting bits so that they face in opposite directions generally crosswise of the table, they alternately may be employed to cut crosswise of the table by operation of the cross feed drive mechanism.

These and other features of the present invention, which are described at a later point, may be embodied in machines of various form and may be utilized in conjunction with various controls, either manual or automatic. A typical embodiment of the present invention is shown in the accompanying drawings in which:

Figure 7 is an enlarged fragmentary sectional view taken from Figure 3, further illustrating the driving mechanism of the rocking tool shaft.

Figure 8 is a sectional view taken on line 8—8, Figure 7, illustrating the crank mechanism connecting the tool motor to the rocking tool shaft.

Figure 9 is a fragmentary view taken from Figure 8, with certain parts broken away to more clearly illustrate the yieldable rocking lever of the tool shaft.

Figure 10 is a sectional view taken on line 10—10, Figure 8, further detailing the tool motor drive.

Figure 11 is a diagrammatic view showing the movements of the tool slide and rail head control levers.

Figures 12 to 15 are diagrammatic views illustrating the action of the rocking tool shaft and double cutting tool in a double cutting operation.

Figures 16 to 18 are diagrammatic views illustrating the action of the machine and cutting tool in a longitudinal planing operation under electrical control. In these views, the double acting tool is shown cutting in both directions of work travel, the rail head being fed horizontally for flat surface planing.

Figures 19 and 20 are diagrammatic views illustrating the action of the planing machine in cross planing operations, the rail head being advanced in power cutting strokes across the work.

Figures 21 and 22 illustrate the action of the side head in planing the side face of the work.

Figure 23 is a diagrammatic view of a workpiece, illustrating, by way of example, various surfaces which may be cut according to the operations shown in Figures 16 to 22.

Figure 24 is a top plan view showing the slots of a double cutting tool which key the holder to the rocking tool shaft for longitudinal and cross planing.

Figures 25 and 26 are diagrammatic views illustrating the action of the roughing and finishing tools in a duplex planing operation.

Figures 27 and 28 are diagrammatic views projected from Figures 25 and 26, showing in plane the roughing and finishing cuts.

Figure 29 is a diagrammatic section taken on line 29—29, Figure 27, illustrating diagrammatically the cutting depth and cross feed of the tools during the duplex cutting stroke.

Figure 30 is a diagrammatic section taken on line 30—30 of Figure 28 illustrating the cutting action of the roughing tool during the return motion of the table.

Figure 31 is a view similar to Figure 29, illustrating the tool feed movement at the end of the roughing cut of Figure 30.

Figures 32 and 33 are perspective views illustrating a modified double cutting tool.

Figures 34 to 36 are circuit diagrams of the electrical control system.

Planing machine

Figure 1:
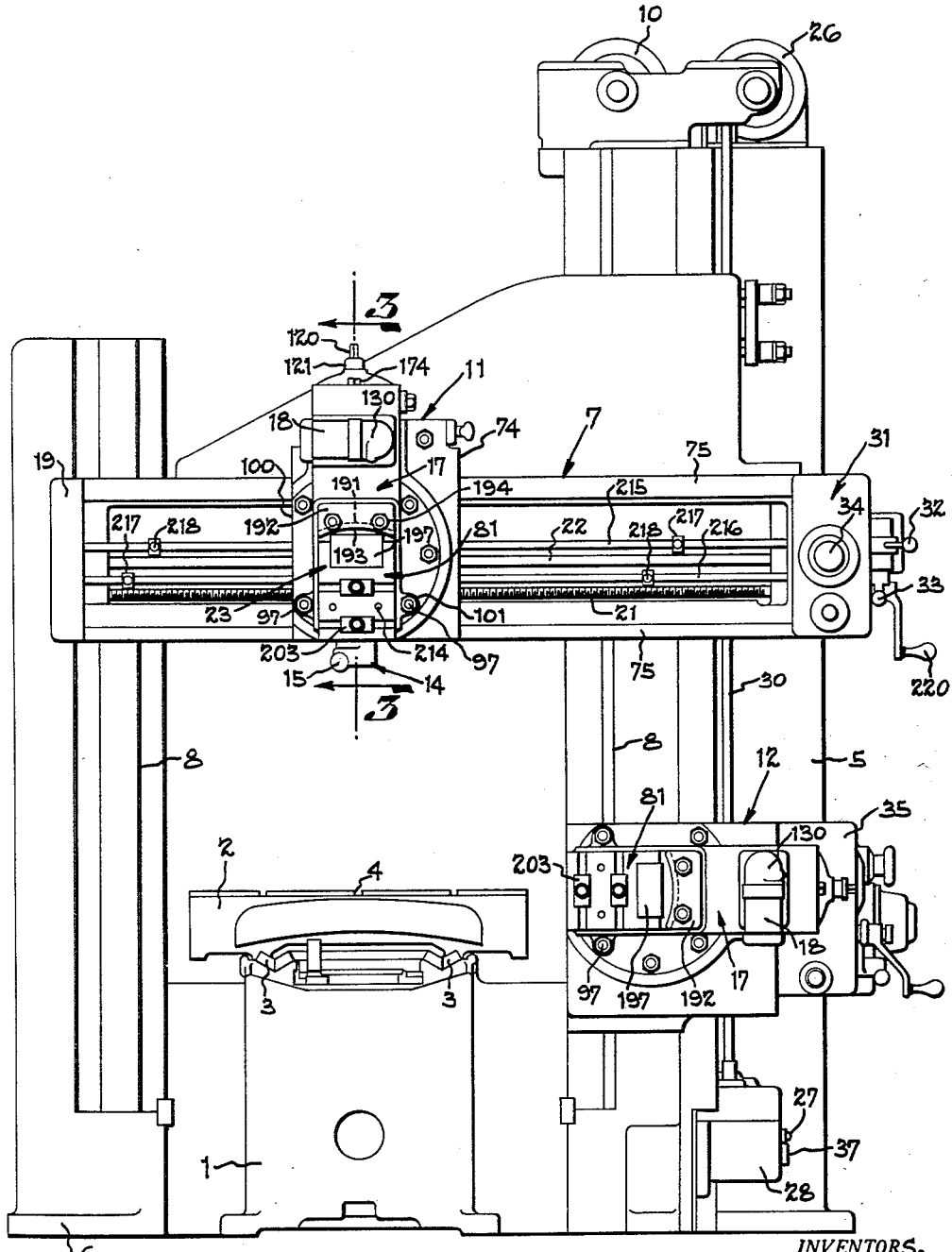
Figure 1 is an end view generally illustrating a planing machine incorporating the present improvements.
Figure 2:
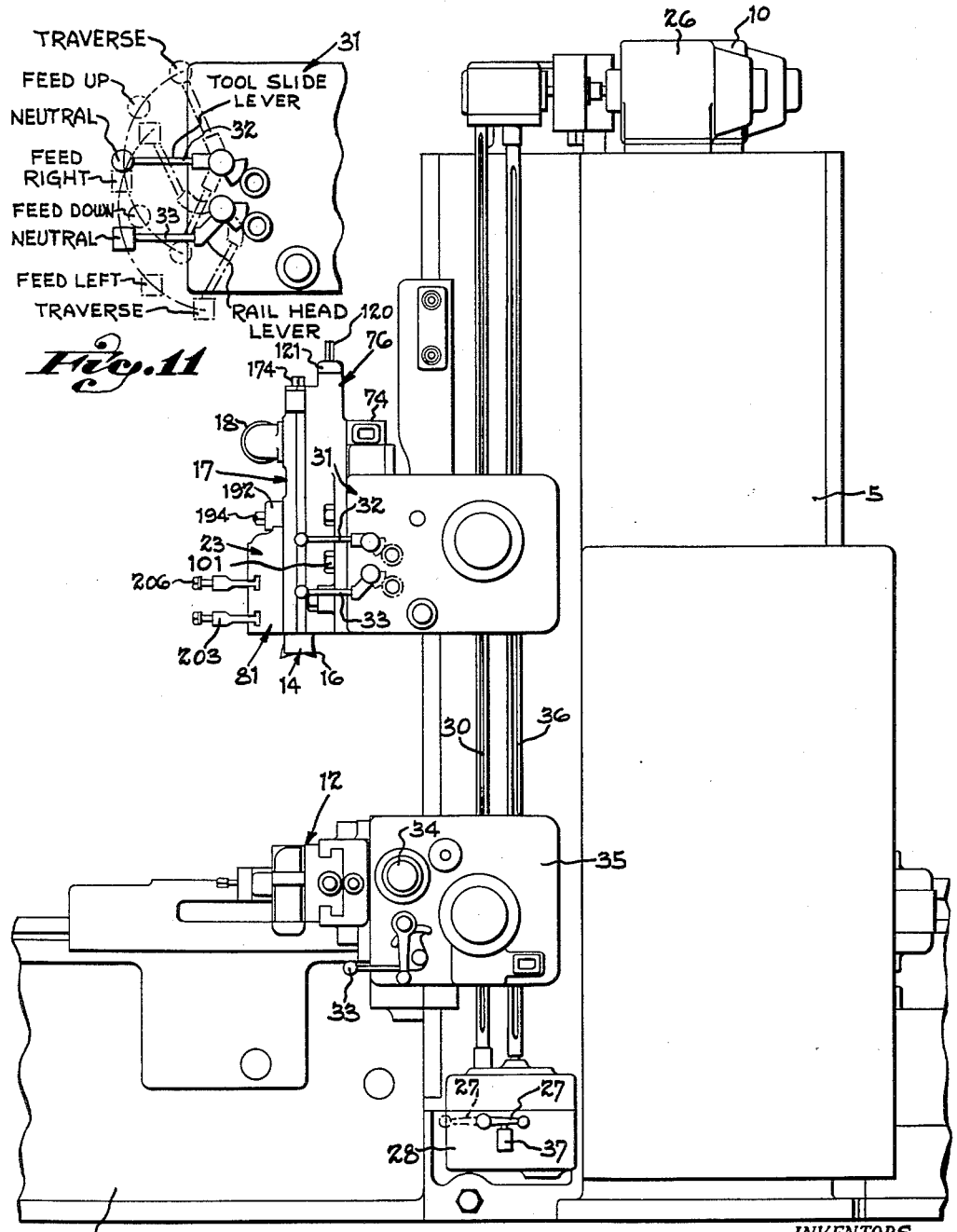
Figure 2 is a fragmentary side elevation projected from Figure 1.

The general organization of a planing machine embodying the present invention is illustrated in Figures 1 and 2 of the drawings. This type of machine is known in the industry as a convertible openside planer and has been selected to illustrate the principles of the invention. It will be understood however, that it is contemplated to apply the invention to various other machine tools.

Referring to Figures 1 and 2, the planer comprises a bed 1, having a table 2 which is slidable longitudinally along the bed upon ways or V bearings 3. A table motor, as noted later, is connected to the table for reciprocating it along the bed. The upper surface of the table is provided with the usual T-slots 4, the work piece being mounted upon the table and secured in position by appropriate clamping devices which are anchored in the T-slots.

The convertible planer is provided with a column or vertical housing 5 permanently secured to one side of the bed and a removable housing 6 secured to the opposite side and aligned with column 5. The planer can be converted to an openside machine by removing the housing 6. A cross rail 7 is slidably mounted upon column 5 and projects horizontally across the table to the removable housing 6. When utilized as an openside machine, the cross rail extends in cantilever fashion across the bed; however, when used as a double housing planer, as shown, housing 6 is used as a support for the outer end of the rail.

Both housings 5 and 6 are provided with vertical slideways 8, engaging the cross rail. An elevating screw (not shown), driven by a rail setting motor 10, including suitable controls, is connected to the cross rail for raising and lowering the cross rail. After the rail is set to the proper elevation with respect to the work it is clamped in position.

The conventional planing machine includes one or more compound tool heads or rail heads, which are slidably mounted upon the cross rail for movement along the rail and across the work. The rail head carries at least one cutting tool which is presented to the top surface of the work carried by the table. The conventional machine may further include one or more side heads, similar to the rail heads, but movable vertically along the vertical slideways 8 and carrying a cutting tool projecting toward the face side of the work.

Feeding means are provided for advancing the rail head horizontally and the side head vertically. The rail head and side head are further provided with tool feeding means for shifting the cutting tool along a line perpendicular to the work surfaces.

In surface planing with a conventional machine, the table is shifted longitudinally by power, thus moving the work relative to the cutting tool during the cutting stroke. When the trailing end of the work passes beyond the tool, the direction of table movement is reversed. If a single cutting tool is used, the tool is lifted to a non-cutting position at this point and remains in non-cutting position during the return movement of the table and work. Also, at the end of the stroke (tool disengaged), the head and its tool are fed transversely to a position for the next cut. This operation is repeated until the tool has been traversed in steps across the work surface, with the successive parallel cuts partially overlapping one another.

The operation of the side head is the same, except that the head and tool are fed vertically to finish the side face of the work.

In another conventional planing operation, the rail head remains stationary and the cutting tool is fed in a line perpendicular to the plane of the work surface. This technique is followed, for example, in forming a slot longitudinally in the work, an incremental downward feeding motion being imparted to the tool at the limit of table motion, thus deepening the slot upon each cutting stroke.

The novel features of the invention and principles of operation are outlined briefly below.

Double cutting

According to one aspect of the present invention, an improved rail head, indicated generally at 11 (Figures 1 and 3), provides double cutting, that is, a cutting stroke in both directions of table movement. A side head 12, of similar construction, provides double cutting along the side face of the work. For this purpose, the improved rail head 11 (and side head) is provided with a rocking tool shaft 13 generally perpendicular to the work surface (Figure 12). The tool shaft carries a double acting tool holder 14 having two opposed cutting bits 15 and 16 of similar form. This shaft is mounted for rocking motion in a tool slide 17 (Figure 3) and is connected to a reversible tool motor 18 (stall motor) carried by the tool slide (Figure 10). The stall motor is energized in forward or reverse direction to rock the shaft, as explained later, when the end of the work moves beyond the cutting tool at both limits of table movement. The rocking movement of the tool shaft alternately presents the opposed cutting bits 15 and 16 to the leading end of the work, in its direction of travel so that a cutting action is obtained in both directions of movement.

As indicated diagrammatically in Figure 12, the axis of tool shaft 13 is perpendicular to the plane of travel of the work 20 but is inclined a few degrees from the perpendicular in relation to the transverse plane of the work. The cutting edges of the opposed bits reside in a common, generally horizontal plane, but the transverse inclination of tool shaft 13 correspondingly inclines the plane of rotation of the bits. As shown in Figures 12 and 14, the bits are disposed to the side in which the shaft is inclined. Accordingly, when the shaft is rocked or partially rotated, the cutting edge of one bit is shifted to a point in the plane of rotation which is below the cutting edge of the opposite bit. This motion not only presents the opposed bits alternately to the work, but also provides clearance, indicated at 9, for the non-cutting bit to avoid dragging it across the work. This preserves the life of the bits.

Briefly therefore, the cutting edges of the opposed bits 15 and 16 are shifted alternately to the cutting plane as the tool holder 14 is rocked in forward and reverse directions at the end of the cutting strokes. During a surface planing operation therefore, one bit completes one cut, and upon table reversal the opposed bit is shifted to cutting position. At the same time, the rail head is fed transversely to relocate the bit, thereby to make the next cut in overlapping relationship with the last cut.

It is to be noted that the rail head is fed transversely by a rail screw indicated generally at 21. Feed motion of the tool perpendicular to the work surface, as in slotting, is imparted by a tool feed rod indicated generally at 22. The rail screw 21 and tool feed rod 22 have their left ends journalled in a bearing bracket 19 at the left end of the rail (Figure 1) and their right ends journalled in a rail transmission 31.

When the rail screw 21 is used as a driver for the rail head 11, it imparts the cutting force to the head and cutting tool. The rail screw therefore is subjected to considerable end thrust during the cutting strokes in both directions of travel. The opposite ends of the screw are carried by thrust bearings which maintain tension upon the screw to absorb the thrust. Since this structure is well known in the art it has been omitted from the drawings.

Duplex cutting

In addition to double action cutting, the improved rail head provides a duplex cutting action in which the double acting cutting tool holder 14 coacts with a finishing tool (single acting) for concurrently rough cutting and finishing the work surface (Figures 25 to 31). For this purpose, the rail head includes a clapper box indicated generally at 23 for mounting the single cutting finishing tool 24 adjacent the double cutter 14. A driving connection, as explained later, actuates the tool shaft 13 and clapper box 23 concurrently at the end of each cutting stroke. The clapper box presents its finishing tool to the work during travel in one direction for a skim-cut and lifts it from the work during travel in the opposite direction (Figures 25 and 26). At the same time, the double cutting tool 14 cuts during travel in both directions.

Cross planing

The present machine further provides cross cutting, that is, a planing operation transversely across the table and work (Figures 19 and 20). In this case, the rail head 11, is moved by power along the cross rail 7 and cuts crosswise of the work 20. The cross planing technique can be applied either to single cutting, double cutting, or duplex cutting.

During longitudinal surface planing (double cutting), the rail screw 21 acts as a feeder and is actuated by a single cycle feed motor 25 as explained later. However, during cross planing, rail screw 21 is driven by a reversible power traverse motor indicated generally at 26. Sustained reciprocation of the rail head 11 along the rail is obtained by an electrical control system which reverses traverse motor 26 at the opposite limits of rail head reciprocation.

It is to be noted that the side head 12 is a duplicate of the rail head 11, except that it is positioned to machine the side face of the work. The side head is arranged to be coupled either to the single cycle feed motor 25 for vertical feed or to the traverse motor 26 for vertical reciprocation. It is therefore arranged to perform longitudinal cutting operations along the side face of the work with longitudinal table motion and vertical feed (motor 25). It is also capable of cross planing across the side face by vertical reciprocation when coupled to the reversible power traverse motor 26.

The various mechanisms for double cutting, duplex cutting, and cross cutting, as noted briefly above, are described later in detail.

Mechanical rail head feed

The planing machine illustrated in Figures 1 and 2 is equipped with a driving connection from the table drive to the rail screw 21, and to the tool feed rod 22 for conventional single (action) planing. This driving system is not disclosed in detail since it does not form a part of the present invention.

When the machine is converted to double cutting or to cross cutting, the conventional drive from the table drive is disengaged and a driving connection is established with the single cycle feed motor 25. The selection is made by shifting a (single cut-double cut) selector lever 27. This lever is mounted on a gear box 28 at the base of the column (Figure 2).

The same transmission of the cross rail is utilized for driving the tool feed rod 22 and rail screw 21, whether the machine is set up for single planing or for operation according to the invention; therefore, the description of the mechanical feed drive follows.

In general, the mechanical feed includes driving means (not shown) extending from the table drive to gear box 28. When the selector lever 27 is in single cutting position, as shown in broken lines, the gear box mechanism is coupled to a vertical splined feed shaft 30 passing through a transmission 31 mounted upon the end of the cross rail. The rail transmission 31 includes a tool slide control lever 32 and a rail head control lever 33. These levers selectively couple the vertical feed shaft 30 either to the tool feed rod 22 or to the rail screw 21. Accordingly, when the (single-double) selector lever 27 is in position for single action cutting, the feed movements of the table drive are transmitted by the gear box 28 to the vertical feed shaft 30.

The rail transmission 31 includes gearing under the control of the levers 32 and 33 for rotating the rail screw 21 or tool feed rod 22 in either direction relative to the vertical feed shaft 30. The transmission 31 further includes a feed change mechanism for regulating the increments of feed motion. The feed rate is selected by a feed dial 34 mounted on the rail transmission 31 as shown in Figure 1.

Referring to Figure 11, the control levers 32 and 33 of the rail transmission 31 are shown in their neutral positions. Each of the levers is shiftable to four positions from neutral as indicated in broken lines. When tool slide lever 32 is shifted upwardly to its first position, the vertical feed shaft 30 is coupled to the tool feed rod 22 to feed the tool slide 17 and tool upwardly. When the lever is shifted downwardly from its neutral position, the drive is reversed to feed the tool slide 17 downwardly.

The rail head control lever 33 in the same way, connects the rail screw 21 to the vertical feed shaft 30, thereby, feeding the rail head in forward or reverse directions when lever 33 is shifted up or down from its neutral position as indicated.

When the tool slide lever 32 is shifted to either of its up or down limits for power traverse, the tool feed rod 22 is coupled to the vertical power shaft 30. The cross rail transmission 31 includes control switches (Figure 36), which are connected to the reversing power traverse motor 26. This motor is connected to the vertical power shaft 30. The switches energize the motor 26 in forward and reverse directions upon movement of the tool slide control lever 32 to either of the rapid traverse limits, thereby to traverse the tool slide in the direction indicated.

Upon shifting the rail head lever 33 to its up or down limits, the vertical power shaft 30 is coupled to the rail screw 21. This lever is also arranged to actuate the control switches so as to energize the motor 26 in forward or reverse direction. The motor thus traverses the rail head 11 to the right or left as determined by the lever position.

The side head 12 is provided with a similar rail head control lever 33 for controlling vertical head feed and traverse motion in either direction. The side head transmission 35 is in driving connection with the vertical feed shaft 30 and with a vertical power shaft 36 as described later with reference to Figures 21 and 22. The mechanism is similar to the cross rail except that the motion is vertical instead of horizontal. If desired, the side head rail may also include a tool slide control lever similar to lever 32 of the cross rail for feeding and traversing the tool slide.

From the foregoing, it will be seen that the tool slide of rail head 11 is shifted in a vertical feed stop each time the table reaches its limit of reciprocation. This occurs when the tool slide control lever 32 is in feed position. If the rail head lever 33 is in feed position, then the rail head 11 will be advanced in feed increments horizontally across the work at the limit of table reciprocation.

When the selector lever 27 is shifted to its second position for double cutting, as shown in full lines in Figure 2, then the feed motion from the table drive is uncoupled and the vertical feed shaft 30 is coupled to the single cycle feed motor 25. This motor is mounted near the base of the column 5. The gear box 28 includes a double cutting switch indicated diagrammatically at 37 in Figures 2 and 36. This switch is tripped when the double cutting lever is shifted to the position indicated and energizes the electrical control system which actuates the single cycle feed motor 25 at each limit of the cutting stroke to provide the selected feed movement. The control system also reverses the position of the double cutting tool at each limit of the cutting stroke. As explained with reference to the diagrammatic views, Figures 16 to 22, the planing machine is equipped with limit switches which are tripped at the limits of the cutting stroke of the table (or rail head) so as to energize the feed motor 25 and tool reversing stall motor 18 by electrical control.

Briefly thereto, when the single-double cutting selector lever 27 is in double cutting position, the mechanical driving system is decommissioned and the feed is under control of the electrical system. It will also be understood that the rate of feed of the tool slide or rail head is under the control of the feed dial 34, noted above, whether the machine is set for single cutting or double cutting. The direction or feed under electrical control is determined by the position of the levers 32 and 33.

The electrical control system also energizes the power traverse motor 26 when the machine is set up for double cutting to move the rail head transversely for cross planing. The cross planing operations, with double cutting, are also under electrical control by means of limit switches which are mounted relative to the cross rail. The several double cutting operations, which the present machine is capable of performing, are explained briefly in the following section.

*Double cutting operation (longitudinal and cross planing)*

The most common double cutting operations provided by the present apparatus are illustrated in the diagrams of Figures 16 to 22. It will be understood that selector lever 27 is in double cutting position with switch 37 closed to energize the control system.

For simplicity, the drive from the cross rail transmission 31 is indicated diagrammatically by bevel gears which are shown selectively coupling the tool slide feed rod 22 and rail screw 21 to the vertical power shaft 36 and vertical feed shaft 30. The several driving connections of the bevel gears correspond to the feed positions of the tool slide control lever 32 and rail head control lever 33, as indicated in Figure 11.

The operations performed during a longitudinal double-cutting operation upon the top surface of a work piece 20 are shown diagrammatically in Figures 16 to 18. Described generally, the table 2 is reciprocated in forward and reverse directions by the reversible table motor 38, which is illustrated diagrammatically in driving connection with the table. The rail screw 21 is in driving connection with the single cycle feed motor 25. The feed motor is connected to the rail screw 21 by way of the vertical feed shaft 30.

The periodic rotation of the vertical feed shaft 30 may be transmitted either to the rail screw 21 for feeding the rail head transversely or to the tool slide feed rod 22 for feeding the tool vertically. In the present example, the rail screw is coupled to the feed shaft 30 during longitudinal planing by shifting rail head control lever 33 to feed position in the desired direction. This feeds the rail head one step across the work surface each time the single cycle feed motor is energized (Figure 18). The driving train from the vertical feed shaft 30 to the rail screw 21 is indicated diagrammatically by the bevel gears 40. These gears represent the driving system of the rail transmission 31.

The incremental feeding motion is imparted to the rail head by a single cycle clutch indicated at 41 (Figure 35), which is released to execute one feeding movement each time the end of the work piece advances beyond the end of the cutting tool. The amount of horizontal feed is variable and is controlled by the feed selector dial 34 of rail transmission 31.

As noted, the double bit tool holder 14 is rocked to its alternate cutting positions by the tool motor 18. The driving connection from the motor to the rocking tool shaft is described later. It will be understood at this point, that the tool motor is energized to reverse the tool when it is clear of the end of the work at opposite ends. This occurs when the feed movement is imparted to the rail head.

Referring to Figures 16 and 17, the planing machine is provided with left and right limit switches, indicated at 42 and 43, which are located at opposite ends of the bed. Thus, as shown in Figure 16, the arm of left limit switch 42 is tripped when the table 2 reaches its left hand limit of travel and the right limit switch 43 is tripped at the right hand limit (Figure 17). As described later with reference to the electrical diagram (Figure 36), the limit switches are interconnected with a control circuit. The control regulates the operation of the table motor 38, the single cycle clutch 41 of the feed motor 25, the reversible power traverse motor 26 and tool motor 18. The limit switches are mounted for adjustment along the rail to provide a predetermined amount of overtravel between the end of the work and cutting tool at the limits of motion.

When the left limit switch 42 is tripped, as shown in Figure 16, the control circuit is conditioned to reverse the table motor 38 so as to stop the table, then drive it in the opposite direction as indicated by the arrow. At the same time, the tool motor 18 is reversed so as to rotate the tool holder 14, as indicated by the arrow, thereby to bring the cutting bit 15 into active position. The single cycle clutch 41 (feed motor) is also energized at this time to release the clutch and thus impart the feeding movement to the head in the direction indicated by the arrow in Figure 18.

The amount of overtravel is sufficient to allow the tool to be reversed and the rail head to be fed to its new position before the work is brought into engagement with the cutting bit. Immediately thereafter, the table is advanced by the table motor toward the right to make the next cut.

Upon reaching its right hand limit (Figure 17), the table trips the right limit switch 43, the end of the work having overtravelled the cutting tool as indicated. The above operations are repeated at this point to bring bit 16 to cutting position, reverse the table, and feed the rail head in the same direction. These operations are repeated at each limit of table movement until the head has been fed in steps across the entire surface of the work to be planed.

The machine is shown diagrammatically in Figure 19 in a cross planing operation, in which case the head is advanced by power transversely across the work. The cross planing is intended principally for slotting operation, utilizing a double cutting slotting tool of a known type (not shown). However, it may also be applied to surface planing, utilizing the double cutting tool holder 14. In this case, the tool slide may be adjusted angularly to the line of travel to provide clearance for the non-cutting bit. The tool holder 14 is mounted at right angles to its former position, that is, rotated 90 degrees on the tool shaft.

In the cross planing operation of Figure 19, a flat surface is planed transversely of the work piece using the double cutting tool 14, which, as explained above, takes a cut during movement of the head in both directions. The non-cutting bit may be allowed to drag across the work surface if the area to be planed is not great. On the other hand, the tool slide may be shifted to slight angle from the perpendicular in the line of travel to provide bit clearance if a large area is to be planed. In cross planing the flat surface, the table 2 and work 20 may be fed in steps longitudinally after each cutting stroke. The table may be fed manually by operation of the handwheel 44 shown in Figure 16 or automatically by periodic energization of the table motor.

As shown in Figure 19, the rail head is fed at a cutting speed along the rail by operation of the rail screw 21, the rail screw being coupled to the vertical power shaft 36. The driving connection is indicated diagrammatically by the bevel gear 45 shifted into mesh with gear 46 keyed to the rail screw. The vertical power shaft 36 is driven in forward and reverse directions by the reversing power traverse motor 26, as explained earlier.

For cross planing, the cross rail is provided with left and right limit switches 47 and 48 which are adjustably mounted upon opposite ends of the rail, the arms of the switches being positioned to be shifted by the rail head. The position of these switches is dictated by the width of the work surface to be planed and the required overtravel of the tool at opposite sides of the work. The limit switches 47 and 48 are interconnected in the control circuit of Figure 36, previously noted.

As explained later with reference to the electrical circuit, the limit switches are arranged to reverse the tool motor during overtravel at each side of the work and to reverse the power traverse motor 26 at the same time. The limit switches thus provide sustained reciprocation of the head and tool reversal at opposite limits.

The cross planing operation is of particular advantage in machining a surface both longitudinally and transversely of the work, since both operations can be done without disturbing the position of the work on the table. A work piece of this character is illustrated diagrammatically in Figure 23. The several machining operations performed upon it are described below.

When cross planing a vertical surface, such as a slot or the like (Figure 20), the cutting tool is fed downwardly at the end of each stroke by operation of the single cycle feed motor 25. For this purpose, the vertical feed shaft 30 is coupled to the tool slide feed rod 22, the connection being indicated diagrammatically by the bevel gears 50 and 51 in mesh. Accordingly, at opposite limits of head cross travel, the limit switches energize the single cycle clutch to feed the tool downwardly when power traverse motor 26 is reversed. This is indicated by the arrow in Figure 20.

Side head

In machining the side face of the work, as shown in Figure 21, it is necessary to reciprocate the side head 12 in vertical power strokes. This produces cuts which extend vertically across the side face instead of longitudinally. The side head is shifted vertically by a stationary vertical screw 52 extending along column 5 and engaged by a rotatable nut 53 mounted in the side head. The nut is rotated either by the vertical power shaft 36 or by the vertical feed shaft 30. The selective driving connection is indicated diagrammatically by the nut coupling shaft 54, extending from the nut and arranged to be coupled to the power shaft or to the feed shaft.

In the vertical machining operation of Figure 21, the vertical power shaft 36 is coupled to the nut 53, as indicated diagrammatically by the shiftable bevel gear 55 meshing with the nut coupling shaft 54. The vertical power strokes of the side head 12 are controlled by the up and down limit switches 57 and 58 adjustably mounted upon the column 5 and conditioning the control circuit to provide sustained vertical reciprocation of the head (power traverse motor drive). In the event the cut requires longitudinal work feed, the table is advanced in feed steps at the limits of vertical tool motion (hand wheel 44).

Figure 22 illustrates diagrammatically the operation of the side head 12 in planing a vertical surface along the side face of the work, the table being fed longitudinally by the table motor. In this case, the tool may be fed vertically from vertical feed shaft 30 coupled, as indicated diagrammatically, by the bevel gears 60 and 61. These gears drive the nut 53 of the side head, as explained earlier, to feed the side head vertically from the single cycle feed motor 25. During the side planing operation, the reciprocation of the table is controlled by the limit switches 42 and 43 of the bed as described above with reference to Figure 16. The tool motor 18 of the side head is connected in the same manner to the control circuit so as to bring the cutting bits alternately to cutting position at the limits of the cutting stroke.

One of the particular advantages of selective longitudinal or cross planing is to allow the work to be planed longitudinally or transversely to a desired configuration without disturbing the work. In other words, instead of unclamping and shifting the work, the appropriate tool head is placed in operation to plane either longitudinally or transversely, as indicated above.

It will be understood that in vertical side planing (Figure 21 or 22), the tool may be fed inwardly at the limits of the cutting stroke by coupling the vertical feed shaft 30 to the vertical tool feed rod 62, as indicated diagrammatically by the pairs of bevel gears 63 and 64 on coupling shaft 65. Other cutting operations, not described, may also be executed by combining the feed and power drives indicated above.

The planed work illustrated diagrammatically in Figure 23 is intended to illustrate a typical example of the surfaces which may be machined by selective operation of the heads. For example, the top surface 66 of the work may be planed according to Figures 16 to 18, utilizing the double cutting tool and driving the table longitudinally, as indicated by the arrow. The longitudinal vertical surface indicated at 67 may be planed by coupling the vertical feed shaft 30 to the tool slide feed rod 22 for downward tool feed (not shown in the diagram). The depressed top surface 68 may then be machined by coupling the rail screw 21 to the vertical feed shaft 30 (Figure 18).

The depressed surface 70 across the top may be machined by cross planing (Figure 19). In this case, the tool is not fed, but the work is fed by advancing the table (hand wheel 44).

The end face 71 of the work 20 may also be planed crosswise, with the rail screw 21 coupled to the vertical power shaft 36 and the tool slide feed rod 22 coupled to the vertical feed shaft 30 as shown in Figure 20. During this operation, the tool is fed downwardly at the limits of the transverse rail head strokes as indicated by the arrow.

For the in-set surface 72 at the side face, the side head 12 may be reciprocated vertically (Figure 21), utilizing the limit switches 57 and 58 for sustained reciprocation. In this case, the work may be advanced longitudinally (hand wheel 44) at the limits of vertical tool movement. The side face 73 may be planed longitudinally with the side head, utilizing the table motor for longitudinal table movement, combined with vertical side head feed, as shown in Figure 22.

*Rail head*

As noted earlier, the rail head 11 and side head 12 of Figure 1 are identical in construction, the rail head being mounted on the cross rail, the side head being mounted on the vertical slideways 8 of column 5. The following detailed description of rail head 11 therefore applies also to the side head 12.

Figure 3:
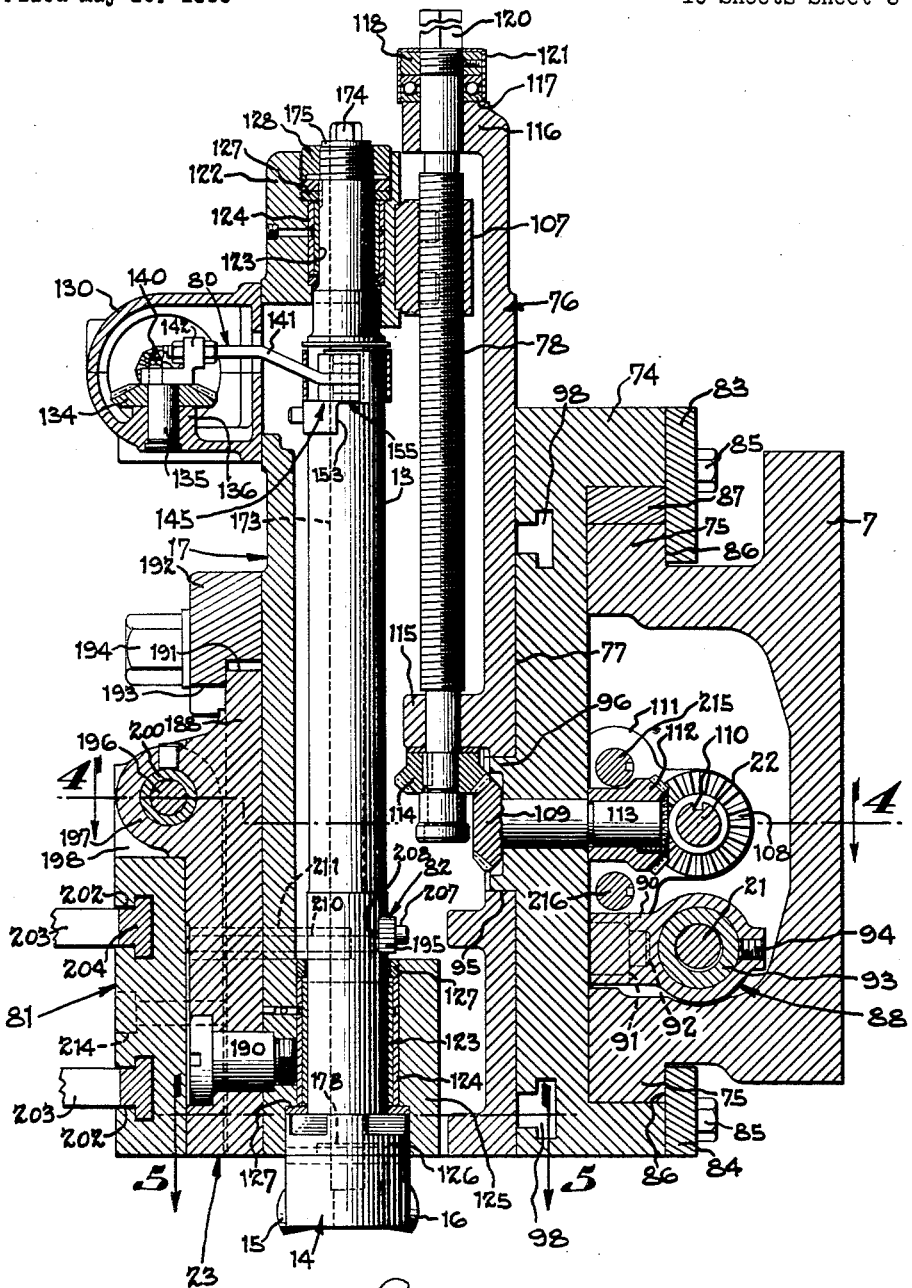
Figure 3 is a sectional view taken on line 3—3, Figure 1, detailing the rail head construction.

Referring to Figure 3, which is taken along lines 3—3 of Figure 1, the rail head in general comprises a saddle 74 slidably embracing the horizontal slideways 75 of cross rail 7. The saddle and the parts mounted upon it are movable along the cross rail upon rotation of the rail screw 21 as explained earlier. A swivel or harp, indicated generally at 76, is mounted upon the vertical face 77 of the saddle and is arranged to be adjusted angularly in the vertical plane of the saddle. The tool slide, indicated earlier at 17, is mounted upon the swivel 76 and is slidably connected to it for vertical tool feed movement in the plane of the saddle. A vertical screw 78 for tool feed has its opposite ends rotatably journalled in the swivel and is connected to the tool slide for vertical tool slide motion upon screw rotation. As explained later in detail, the vertical feed screw 78 is in driving connection with the slide feed rod 22 of the cross rail.

The rocking tool mounting shaft 13, previously noted, is journalled in the tool slide 17 along a generally vertical axis and is connected to the tool motor 18 (Figure 8) by a crank mechanism indicated generally at 80. The crank mechanism, as explained in detail later, rocks the tool shaft and its cutting tool in forward and reverse directions in response to the energization of the tool motor at the limits of the cutting stroke. This presents the opposed cutting bits alternately to the work surface for double cutting.

The tool slide further includes the clapper box indicated earlier at 23, the clapper box being mounted for angular adjustment with respect to the tool slide in the vertical plane of adjustment of the swivel. The clapper box includes an apron or tool mounting block indicated generally at 81 (Figure 3), which is pivotally mounted for swinging motion in the direction of table movement. The apron is arranged to mount the single action finishing tool 24 and is in driving connection with the rocking tool shaft 13 by a pin and lever connection indicated generally at 82 (Figure 3). The position of the apron 81 in Figure 3 represents the cutting position during travel of the work from left to right. When the rocking tool shaft 13 reverses the double cutting tool holder 14 for cutting in the opposite direction of work movement, the pin and lever connection 82 pivots the apron and its cutting tool to a non-cutting position.

The clapper block is employed for single cutting operations in the conventional manner and also converts the machine to the duplex cutting operation shown in Figures 25 to 31.

As described earlier, with reference to the operation diagrams (Figures 16 to 22), the saddle 74 carries the swivel and tool slide as a unit along the cross rail in incremental feeding steps when the rail screw 21 is coupled to the single cycle feed motor 25 (or table drive). The saddle is shifted along the rail by power when the rail screw 21 is coupled to the power traverse motor 26. During saddle motion, the swivel remains in its angularly adjusted position relative to the saddle, thus supporting the tool slide 17 and rocking tool shaft 13 at the desired inclination to present the cutting bits alternately to the plane of the work.

In a longitudinal flat planing operation with double cutting (Figure 16) the vertical tool feed screw 78 will remain stationary throughout the operation so as to position the cutting tool vertically relative to the plane of the work. During this operation, the rail cross feed screw 21 advances the rail head in predetermined feeding steps by operation of the single cycle motor, as noted earlier.

In another longitudinal planing operation, for example, in forming a vertical surface the rail screw 21 remains stationary, as noted earlier, and the tool slide is fed downwardly by intermittent rotation of the slide feed rod 22, by the single cycle feed motor. The motion of feed rod 22 is transmitted to the vertical tool feed screw 78 so as to move the tool slide along a vertical line as determined by the angular adjustment of the swivel.

Described in detail, the saddle 74 is slidably locked to the cross rail 7 by the plates 83 and 84 along its upper and lower edges. These plates are secured by screws 85 to the rearward surface of the saddle and overhang the vertical bearing surfaces 86 of the rail slideway 75 at top and bottom. The plates are thus in bearing engagement on one side of the rail and maintain the saddle securely in bearing engagement against the vertical bearing surface 86 on the opposite sides of the rail. The plates 83 and 84 are of heavy construction and are capable of absorbing heavy cutting thrusts during the longitudinal cutting operations in both directions. The vertical bearing surfaces 86 of the saddle and rail are at right angles to the line of table travel so as to react at right angles to the thrusts. Along the upper edge of the saddle, at opposite ends, a longitudinally tapered gib 87 is interposed to adjust the saddle snugly in bearing engagement with the rail. The gibs 87 are provided with means for longitudinal adjustment relative to the saddle.

The saddle is connected to the rail screw 21 by the nut assembly 88 consisting of a bracket 90 having a base 91 secured to the rear surface of the saddle by screws 92. A nut 93, in threaded engagement with the rail screw 21, resides within a bore of the bracket and is locked by the set screw 94. The bracket assembly is sufficiently rugged to advance the rail head by power during the transverse planing operations.

As shown in Figure 3, the swivel or harp 76 includes a bore 95 which is fitted upon a cylindrical boss 96 projecting from the forward vertical face 77 of the saddle 74. The boss rotatably journals the swivel for angular arjustment of the swivel and tool slide relative to the saddle. The swivel is locked in its adjusted position by T-head screws 97 (Figures 1 and 4) having heads slidably engaged in the T-slots 98 formed in the forward face of the saddle 77. The T-slot is circular, coinciding with the center of cylindrical boss 96. As viewed in Figure 1, the left side 100 of the saddle intercepts the circle of the T-slot to provide open ends for the reception of the T-head screws 97.

It will be understood that the swivel and tool slide are adjusted angularly by loosening the nuts 101 of the T-head screws 97 to relieve the clamping engagement. The nuts lock the assembly rigidly in adjusted position upon being tightened. This adjustment provides the slight angular position of the rocking tool shaft 13 for double cutting.

In cross planing, the tool slide may remain in the plane of the saddle, using the double cutting tool, but allowing the non-cutting bit to drag. In planing large areas however, it may be desirable to adjust the tool slide and rocking tool shaft 13 slightly at an angle to obtain tool clearance. This can be accomplished simply by inserting shims or spacers between the face 77 of the saddle and the rear surface of the swivel 76.

Figure 4:
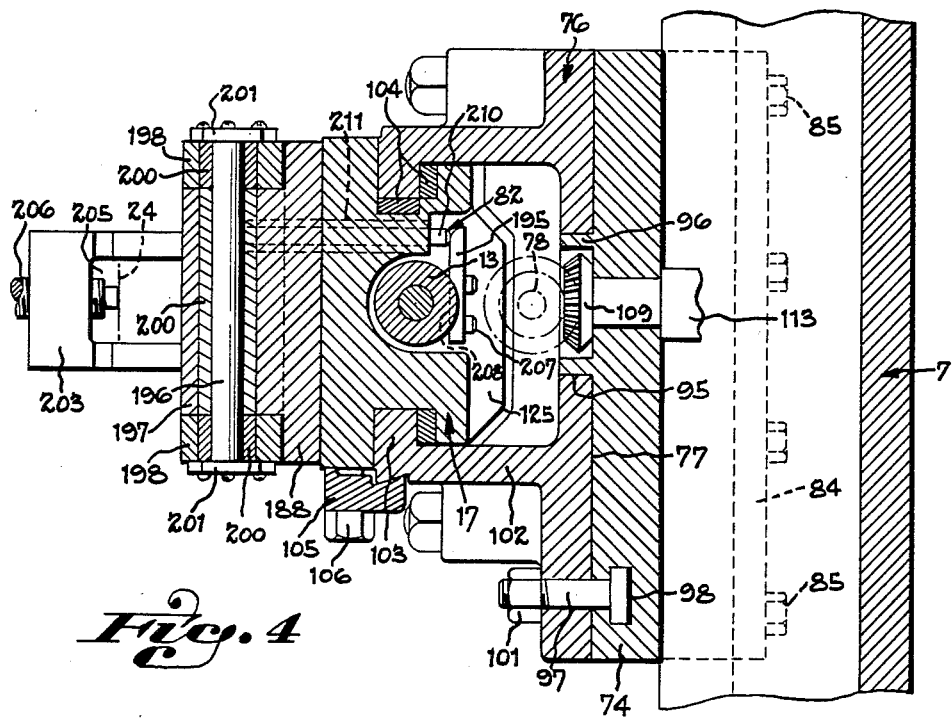
Figure 4 is a sectional view taken on line 4—4, Figure 3, showing the relationship of the swivel and tool slide of the rail head.

As best shown in Figure 4, the swivel 76 is provided with a box-shaped slideway 102 having vertical slide rails 103 engaging the tool slide 17. The tool slide is fitted snugly to the rails 103 by the tapered adjustment gibs 104 at opposite sides. The tool slide 17 may be locked in adjusted position by a clamp bar 105 engaging the slideway 102 and secured to the tool slide by screws 106.

Referring to Figure 3, the tool slide 17 is connected to the vertical tool feed screw 78 by the nut 107 threaded to the screw and attached to the upper portion of the tool slide. The tool screw 78 is in driving connection with the tool feed rod 22 (cross rail) by a bevel gear train including a bevel gear 108 slidably keyed to the tool feed rod 22 by key-way 110 and journalled in a bracket 111 attached to the saddle. Bevel gears 109 and 112, keyed to stub shaft 113 (saddle), drive the bevel gear 114 secured to the lower end of slide screw 78.

The vertical screw 78 has its lower end journalled in a lug 115 of the swivel 76 and its upper end journalled in a cross wall 116 of the swivel. A thrust bearing 117, engaged by a nut 118, is adjusted to maintain the vertical screw 78 under tension. The upper end of the screw includes a squared end 120 for hand adjustment of the tool slide. In addition, the nut may include a graduated dial 121 to provide micrometer adjustment of the tool slide position.

The upper end of the rocking tool shaft 13 is journalled in the top wall 122 of the tool slide. Preferably a sleeve 123 formed of non-metallic material, such as nylon, is fitted in bearing engagement with the shaft and is backed by a metal sleeve 124 fitted into the bore of top wall 122. The lower end of the shaft is provided with similar sleeves 123 and 124 fitted in a boss 125, at the lower end of the tool slide. The tool mounting head 126, at the lower end of the rocking tool shaft 13, provides a bearing surface engaging a thrust washer 127. The upper end of the tool shaft 13 includes a nut 128 threaded on the shaft and engaging a similar thrust washer 127. The nut is adjusted to maintain the tool shaft in tension against the thrust bearings 127—127 and thereby to locate the cutting edges of the tool accurately with respect to the slide.

*Tool rocking mechanism*

The rocking motion is imparted to the tool shaft 13 by the tool motor 18 which, as shown in Figures 1 and 8 is mounted on a housing 130 secured as at 131 near the upper end of the tool slide 17. The motor is connected to the tool shaft by the crank mechanism 80 noted above. Referring to Figure 10 the tool motor 18 includes a small bevel gear 132 keyed to its shaft 133 and meshing with a large bevel gear 134 keyed to a stub shaft 135 which is journalled in a boss 136 of housing 130. As best shown in Figures 7 and 10, a stop arm 137 is secured to the hub of motor gear 132 and its outer end is engageable with a stop lug 138 formed in housing 130. The stop arm limits the rotation of motor gear 132 to slightly less than one revolution as the motor is energized in forward and reverse directions.

The stub shaft 135 includes an eccentric pin 140 projecting upwardly above large bevel gear 134. The pin 140 creates a crank motion as the gear and stub shaft partially are rotated in forward and reverse directions. A link or connecting rod 141, includes a bearing bracket 142 journalled on the crank pin and locked in position by a cotter pin 143. The link 141 is secured to bearing bracket 142 by the nuts 144—144 which provide lineal adjustment of the link. The opposite end of the link is pivotally connected to a rocking lever assembly indicated generally at 145, which projects radially from the tool shaft 13 to impart the crank pin motion to the double cutting tool holder 14. The rocking lever assembly provides a slightly yieldable driving connection with the tool shaft 13, the crank pin having an arc of motion slightly greater than the rocking arc of the tool shaft.

Figures 5, 6:
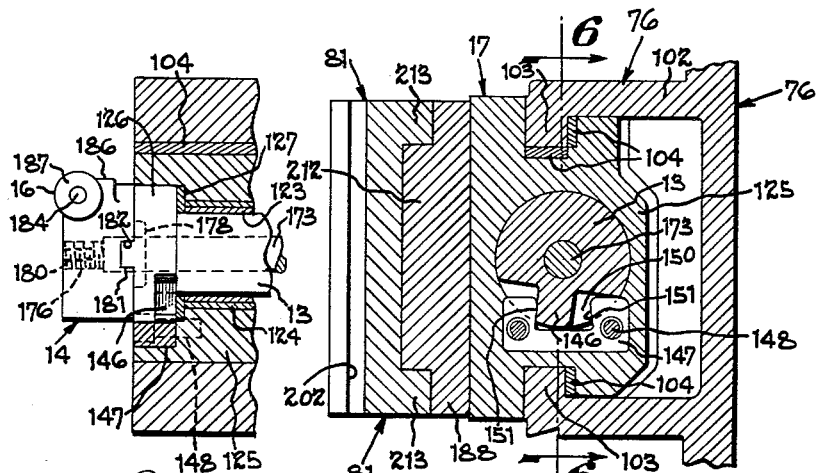
Figure 5 is a sectional view taken on line 5—5, Figure 3, detailing the stop mechanism of the rocking tool shaft.
Figure 6 is a sectional view taken on line 6—6, Figure 5.

Referring to Figures 5 and 6, the tool mounting head 126, at the lower end of the tool shaft 13, has a portion of its circumference machined to delineate a stop lug 146. The lower boss 125 of the tool slide 17 is slotted adjacent the lug to receive a hardened stop plate 147 secured in the recess by screws 148. The plate is generally U-shaped as viewed in Figure 5, the open center portion 150 providing clearance for arcuate motion of stop lug 146. The stop lug 146 engages the opposite radial bearing surfaces 151—151 of the stop plate and thus limits the rocking motion of the tool shaft.

It is to be noted at this point, that the alternate cutting thrusts which are imposed upon the cutting bits 15 and 16, are absorbed by stop lug 146 and stop plate 147. In other words, as viewed in Figure 13, the cutting thrust tends to rotate the tool shaft toward the right, with the stop lug 146 providing a solid backing for the cutting bit (Figure 5). When the tool motor rocks to bring the lug into abutment with the opposite surface of the stop plate, then the lug resists the cutting thrust of the opposite bit as the work moves in the opposite direction.

It will be understood that the current supply to the tool motor 18 is sustained during the cutting stroke, with the motor stalled by stop arm 137. The motor torque, acting through crank mechanism 80 and yieldable lever assembly 145, applies torque to the tool shaft 13 to urge its lug 146 against the stop plate 147. Since the reversal occurs when the tool is disengaged from the work, the tool is rigidly back by stop lug 146 before the cutting stroke begins; moreover, the preloading effect holds the tool rigidly to counteract any tendency for the tool to chatter while cutting.

The yieldable lever assembly 145, as shown in Figures 7 and 8, consists of a mounting block 152 which is generally right angular as viewed in Figure 8. To accommodate block 152, the tool shaft is provided with a flat 153 at one side to seat the block. The block is secured in position by the screws 154. The outer end portion of the block includes a yoke portion 155 residing above the block proper. The yoke projects radially from the shaft and is seated against a second flat 156 at right angles to the first flat 153.

The yoke consists of a pair of limbs 157—157 spaced vertically apart from one another. Between the spaced limbs 157, there is located a movable driving clevis 158, having its inner end pivotally connected as at 160 between the spaced limbs. The outer or swinging end of the clevis is forked as at 161 to receive the outer end of link 141. The end of the link is pivotally connected to the clevis by the pivot pin 162. The clevis is thus free to pivot relative to the yoke 155 upon lineal movement of link 141.

To transmit the movements of the clevis 158 to shaft 13, there is provided a partially cylindrical leaf spring 163 encircling the tool shaft and having its lower edge resting upon block 152. The leaf spring has a pair of radial limbs 164 and 165, yieldably engaged against the opposite sides of yoke 155. The spring limbs are sprung apart when slipped over the yoke, thereby embracing the yoke under preload spring pressure. The spring is locked in position by a snap ring 166 engaged in a groove cut into the tool shaft above the spring.

To accommodate the link 141, the spring limb 164 is slotted as at 167 (Figure 9). It will be noted that the driving clevis 158 is confined between the limbs 164 and 165; therefore, movement of the link 141 in either direction is transmitted from the clevis to one or the other of the spring limbs 164—165, depending upon the direction of motion. Accordingly, when stop lug 146 engages stop plate 147 at the limit of rocking motion, overtravel of link 141 rocks the clevis 158, which in turn, deflects the spring limb in the direction of overtravel. The deflected spring limb thus preloads the tool shaft after its rocking motion is arrested by lug 146. As indicated at 168 in Figure 9, one side of the clevis is notched to clear the curved portion 170 of the spring leaf.

In the example illustrated, the small motor bevel gear 132 and large gear 134 provide a two to one drive ratio. The stop arm 137 limits the rotation of motor gear 132 approximately to 270 degrees, thus rotating gear 134 and crank pin 140 through an arc of approximately 135 degrees. The motion of crank pin 140 to its second position is indicated at 171 in broken lines (Figure 8). The corresponding second position of the rocking lever assembly 145, as limited by stop lug 146, is indicated at 172 in broken lines in the same view. At the limits of crank pin motion, the connecting link 141 and clevis 158 shift slightly beyond the limit of rocking motion permitted by the tool shaft lug 146, thus deflecting the spring limb slightly to preload the tool shaft, as noted above.

The double cutting tool holder 14 is mounted upon the tool head 126 by the draw bar 173, which extends through a bore running axially through the tool shaft 13. The upper end of the draw bar includes a head 174, seated upon a washer 175 and its lower end portion is threaded at 176 (Figure 6). The double cutting tool holder 14 includes a threaded bore 177 (Figure 32) extending through its center and engaged by the threaded end of the draw bar. A concentric centering boss 178 on the holder interfits a bore in the lower portion of the head 126. The lower end of the draw bar is provided with a hexagonal tool socket 180 to receive an Allen type wrench.

As shown in Figure 6, the tool head 126 includes a transverse key 181 projecting from its lower surface and tool holder 14 is slotted as at 182 to interfit the key. This locks the holder securely against rotation to resist the cutting thrusts. The tool holder is mounted by threading it upon the lower portion 176 of the draw bar and rotating the bar to draw the holder firmly against the lower surface of the head with the key and slot interlocked. The socket 180 at the lower end of the bar enables the operator to tighten or loosen the holder in a convenient manner.

The tool holder shown in Figure 24 is slotted as at 182 to present its cutting bits to the work in longitudinal planing operations. For cross planing, it is necessary to rotate the holder to a right angular position. For this purpose, the holder for cross planing is provided with a slot at right angles, indicated in broken lines at 183 in Figure 24.

The cylindrical, button type cutting bits 15 and 16 shown in Figures 6 and 24, are intended primarily for rough cutting; the cuts which they create are in the form of concave grooves, as delineated by the circumference of the bits. As shown, each bit tapers inwardly from its cutting edge towards its opposite end. The taper provides the desired cutting rake or clearance. The bits are made of suitable hardened cutting alloy and are secured in position in the tool holder 14 by screws 184. This permits the bits to be replaced conveniently when worn.

As best shown in Figure 24, the tool holder 14 is provided with recesses 185 at opposite sides shaped to snugly embrace the bits. The inner ends of the bits seat rigidly against the lug portion 186 of the holder, the bits being clamped snugly against the lug by the screws 184 which are threaded into it. The cutting faces 187 of the bits diverge in planes outwardly from the axis of the holder 14. The angulation of these faces, due to the rocking motion of the holder, disposes the face of the active bit substantially at right angles to the line of work travel, as shown in Figures 13 and 15.

As noted earlier, the cutting bits 15 and 16 have their cutting edges residing in a generally horizontal plane of rocking motion, the axis of the tool shaft 13 being inclined slightly in a plane transverse to the line of work travel to include the rocking plane. This provides clearance for the non-cutting bit as indicated at 9 in Figures 12 and 14. To illustrate more clearly the action of the cutting bits, the angle of the rocking tool shaft approximately 2 degrees is exaggerated in Figure 12, as indicated by the angle A.

As shown in Figure 12, the work is moving in the direction indicated by the arrow and the forward bit 15 is presented to the work surface. The radial position of the holder during this cut is indicated in Figure 13.

Figure 14 illustrates the tool shaft rocked to its second position, the opposed cutting bit 16 being presented to the work. The amount of rocking motion imparted to the cutting tool upon the return cut is shown in Figure 15. It will be understood that the angle A may be varied by adjustment of the swivel 76 as explained earlier and that the degree of angulation determines the amount of lift motion imparted to the edges of the non-cutting bit. In other words, if a greater depth of cut is required, the angle A may be increased to provide the required lift.

*Clapper box*

As noted above, the clapper box 23 coacts with the double cutting tool to provide a concurrent roughing and finishing cut in one direction of travel and a roughing cut only in the opposite direction of travel. The rocking tool shaft shifts the finishing tool 24, which is mounted in the clapper box, to the cutting and non-cutting positions.

As best shown in Figures 3 and 4, the clapper box 23 comprises a clapper block 188 secured on the forward face of the tool slide 17, the lower portion of the block being pivotally mounted by the shoulder screw 190 for angular adjustment relative to the tool slide. As viewed in Figure 1, the upper edge 191 of the clapper block 188 is curved on a radius centered on the shoulder screw and a clamp rail 192 has its curved lower edge 193 overhanging the curved edge of the block. Rail 192 is secured by screws 194 to the tool slide, the screws providing a clamping engagement with the arcuate edge of the block to hold it in angularly adjusted position.

Referring to Figures 3 and 4, the clapper apron 81, previously noted, has its upper end pivotally mounted upon a pivot pin 196 extending through a boss 197 at the upper portion of the clapper block 188. The pivoted upper end of the apron 81, at opposite sides, includes trunnion lugs 198 pivotally journalled on the end portions of the pivot pin 196 which project outwardly from boss 197 on opposite sides. Suitable bushings 200 are provided for pin 196 and the outer ends of the pin are locked in position by the plates 201 attached to the opposite sides of the apron by screws.

The clapper apron is generally U-shaped in cross section (Figure 5). The clapper block 188 has a raised central section 212 interfitting the side flanges 213 of the block. The raised section 212 fits closely between the surfaces of the flanges 213 to guide the apron and its tool transversely. The flanges seat against the surface of the clapper block (Figure 5) during the cutting stroke.

The outer surface of apron 81 is provided with a pair of T-slots 202, and each T-slot anchors a respective tool yoke 203 having a T-shaped foot 204 fitted in the T-slots. As shown in Figure 4, each yoke includes a central opening 205 to receive the cutting tool 24. A clamp screw 206 is threaded through the outer end portion of each yoke to clamp the cutting tool in position.

The pin and lever 82, previously indicated, which pivots the apron to cutting and non-cutting positions, consists of a clapper lever 195 (Figure 4) secured by screws 207 to the rocking tool shaft. The shaft is provided with a flat 208 to seat the lever. The swinging end of the lever engages the end of a clapper pin 210 projecting horizontally through the tool slide and clapper block. The pin is slidably mounted in a bushing 211 projecting through the tool slide and clapper block. The outer end of the clapper pin 210 engages the surface of the tool apron 81.

The position of the clapper lever and pin in Figure 4 corresponds with the position of the rock shaft shown in Figure 5 (cutting position of apron). It will be apparent therefore, that when the shaft is rocked to its second position to reverse the tool holder 14, the apron and its tool will be pivoted outwardly to the non-cutting position shown in Figure 26. In the cutting position (Figure 25), the apron is seated against the surface of the clapper block; therefore, the apron and its cutting tool are rigidly backed during the cutting stroke.

The tool apron 81 may be clamped firmly in position against the clapper block during certain operations if necessary. For this purpose the block is provided with a pair of tapped holes 214 in registry with a pair of bores in the apron. When the apron is to be clamped in stationary position, the clapper pin 210 may be withdrawn by swinging the apron upwardly. Thereafter, a pair of clamp screws (not shown) may be passed through the bores and threaded into the clapper block.

To allow the operator to shift the rail head or its tool slide from his position at either side of the machine, the cross rail transmission 31 includes extension control rods 215 and 216 (Figure 1). These rods have their opposite ends journalled in the rail transmission and bearing bracket 196. The rods are respectively connected to the tool slide control lever 32 and rail head control lever 33. Each control rod has at least one lever hub 217 at opposite sides of the rail head. The hubs are slidably keyed to the respective rods, and each includes a socket 218 to receive an end of a detachable hand lever. This enables the operator to rock either of the control rods in setting up the machine.

For hand adjustment in setting up the machine, a detachable crank 220 (Figure 1) may be applied to the rail screw 21 or the tool slide rod 22 for the same purpose.

*Duplex cutting*

The use of the double cutting tool with a finishing tool is indicated diagrammatically in Figures 25 to 31. These views illustrate the coaction between the double cutting mechanism and clapper mechanism. The clapper box is centered on the axis of the rocking tool shaft as viewed in Figure 1. The roughing bits 15 and 16 are displaced to the left of the axis (Figure 1). Thus, in feeding the head to the left, the roughing bits cut in advance of the finishing tool.

The finishing tool 24, clamped by the yokes 203 of the clapper apron, is adjusted vertically to locate its cutting edge below the cutting plane of the double cutting bits. The relative cutting plane of the finishing tool is determined by the thickness of the desired finish cut or skim-cut. The operations shown in the diagrams represent a longitudinal surface planing operation, the rail head being fed transversely toward the left (Figures 30 and 31) after each cutting stroke.

In Figure 25, the work 20 is shown travelling toward the right, the finishing tool 24 machining the finishing cut while the roughing bit 15 concurrently machines a rough cut. Upon completion of the duplex stroke, the tool shaft is rocked to its second position to present bit 16 to the work. Upon tool reversal, the clapper lever 195 shifts the clapper and finishing tool to the non-cutting position as indicated in Figure 26. At the same time, rail head is fed transversely to the left for the next cut (Figures 28 and 30). Upon the return stroke of the work (Figure 26) a single rough cut is machined and the finishing tool idles.

In order to obtain a smooth, flat finish, it is desirable to have the finishing cuts in overlapping relationship. In other words, the tool feed upon each stroke should be substantially less than the width of the finishing tool, whereby the finishing cutting edge passes one or more times across the previously finished surface during successive cuts.

Figures 27 to 31 are intended to illustrate the operation generally. The cutting tools, feed, and depth of cut are diagrammatic and do not represent actual operating conditions. Figure 27 illustrates generally the relationship of the roughing and finishing tools, corresponding to the cut shown in Figure 25.

In Figure 28, which corresponds to Figure 26, the feed of the rail head at the beginning of the return stroke is indicated in broken lines. It will be understood that the finishing tool is also fed transversely but is shifted to non-cutting position as indicated. Accordingly, during the return stroke, the bit 16 forms the next roughing cut while the finishing tool idles. Figure 30, which is a sectional view taken from Figure 28, also indicates the amount of cross feed during the return stroke. The amount of material removed during the return stroke forms a rough cut 221 which is twice the amount of the feed since no finish cut is taken during the return stroke.

Figure 31 represents the next duplex stroke, corresponding to Figure 29 in which both tools are cutting. Since the finishing tool was in non-cutting position during the return stroke, it is now machining the rough cut 221. In other words, the head is fed at the beginning of the return roughing stroke (no finish cut) and is again fed at the beginning of the duplex stroke, thereby finishing two roughing cuts.

It will be understood that the finishing tool must have a cutting edge at least two times the amount of cross feed. It will also be understood that the feed and depth of cut are all variable factors and will vary from one job to the next. The diagrams are intended to illustrate the principle of operation and do not represent actual operating conditions.

Modified double cutting tool

The modified tool holder of Figures 32 and 33, is intended for metals which are difficult to machine, such as certain steels. The tool holder 222 is generally square and utilizes head cutting bits 223 and 224 having straight side and bottom cutting edges 225. As indicated in Figure 33, the holder along one side includes a pair of square recesses 226—226 which form bit seating surfaces 227 converging outwardly in a direction generally radial to the center of the holder. These surfaces are constituted by hardened plates 228 secured by screws 230.

The rearward portion of each bit has a relief which provides a clamping surface 231 parallel to the surface of the holder at opposite sides. Each bit is locked in position in its recess by a clamping block 232 having one end seated against the end of the holder and having its opposite end seated against the clamping surface of the bit. The clamping block includes a screw 233 intermediate its length, threaded into the holder and clamping the bit firmly in position.

When the tool is in operation, the face 234 of each bit resides substantially at right angles to the line of travel of the work as the bits alternately rock to cutting position. The sloping surfaces 235, extending rearwardly from the cutting edges, provide the required cutting angle and clearance rake.

Electrical control system

A simplified control system for regulating the planing machine during double cutting, cross planing, and duplex cutting is illustrated in Figures 34 to 36. The circuit includes relays for the several motors, the relays being controlled by the limit switches of the bed and rail head. These switches shift the table during longitudinal planing and shift the rail head during cross planing. The limit switches and relays also control rail head feed, tool slide feed, and tool reversal, as explained below.

In order to clarify the diagram, the relays and the contacts which they actuate are shown in Figure 34, the contacts being shown connected by a line to their respective actuating relays. For identification, the contacts are aligned horizontally with the positions which they occupy in the circuits (Figures 35 and 36).

Figure 35 illustrates the power circuit for the table motor 38, tool motor 18, power traverse motor 26, and single cycle feed motor. Each of the motors, with the exception of the feed motor, is reversible and each includes forward and reverse contacts which are controlled by the relays. The feed motor 25 is not reversible, since the direction of feed to the tool slide or rail head is controlled by the position of levers 32 and 33 of the rail head transmission 31 (Figure 11).

The control circuit of Figure 36 is disclosed in relation to longitudinal and cross planing operations (reciprocation of table or rail head). It will be understood that the operation of the side head is regulated by the same circuit and motors, however, for purposes of simplicity, the side head limit switches have been omitted from the diagram.

The control circuit (Figure 36) is energized by the low voltage lines 236 and 237, the several relays being connected across the lines and energized by the respective limit switches of the table and cross rail as explained below. When the selector lever 27 (single-double cutting) of gear box 28 is shifted to the double cutting position (Figure 2), the selector switch 37 in the low voltage control line 236 is closed. Accordingly, the mechanical feed drive from the table is disconnected and the machine is placed under control of the electrical circuit. If the machine is set up for longitudinal planing, the table selector switch 238 of the diagram is closed. This places the table motor 38 under control of the table limit switches 42 and 43. If the machine is set up for cross planing, then the table switch 238 is opened and the rail head selector switch 240 is closed.

Longitudinal planing circuit

When the table switch (longitudinal planing) 238 is closed the relays TR and TL, for forward and reverse rotation of the table motor 38, are placed under the control of the table limit switches 42 and 43 (Figures 16–18). It will be noted that the left limit switch 42 in line 241 is arranged to energize relay TR (right table movement) and that the right limit switch 43 energizes relay TL (left table movement) by way of line 242. Accordingly, at the limits of movement, the respective limit switches energize the motor 38 for movement of the table in the opposite direction.

As shown in Figure 35, a three phase power circuit 243 energizes the reversible table motor 38 through reversing contacts TRC and TLC, which provide right and left table motion. The contacts TRC are actuated by the relay TR and the contacts TLC are actuated by the relay TL. When left limit switch 42 is tripped at the left limit of table motion, relay TR closes contacts TRC to reverse the motor 38 for table movement toward the right. At the right limit, the right limit switch 43 energizes relay TL to close motor contacts TLC, thereby to start the table back toward the left.

The limit switches are closed momentarily by the table 2 but reopen as soon as the table begins to move in the opposite direction. In order to keep the table motor circuit closed for the cutting stroke, the table relays TR and TL each include a holding circuit. As shown in the diagram, the circuit for energizing relay TR is by way of supply line 237, branch line 241 (previously noted), left limit switch 42 to relay TR and is completed by way of line 244, through the table selector switch 238 to the opposite supply line 236.

As soon as relay TR is energized, from line 241 (Figurge 16), a holding circuit is established by way of branch line 245, through the normally closed contact TLC (actuated by relay TL), and through contact TRC (actuated by relay TR), which closes as soon as relay TR is energized. Since line 245 shunts the table limit switch 42, relay TR remains energized to translate the table to its right limit (Figure 17).

When the table trips the right limit switch 43 (Figure 17) to energize relay TL, relay TL opens the holding contact TLC (normally closed) of line 245, thus deenergizing the relay TR and causing the TRC motor contacts to open. At the same time, relay TL closes motor contacts TLC for table movement back toward the left.

Relay TL remains energized during left table movement through the holding circuit consisting of branch line 246 and normally closed contact TRC which is actuated by relay TR. The holding circuit is completed by normally open contact TLC, which is closed when relay TL is energized. The TL relay circuit is completed by way of line 244 and selector switch 238 to supply line 236. The table thus continues its movement toward the left until the left limit switch 42 is tripped. At this point, relay TL is deenergized and relay TR is energized for right table motion, as described above.

It will be noted that the left and right limit switches 42 and 43 each include a second contact 247, connected in common to a line 248 leading to the feed relay indicated at FR. The circuit from the feed relay FR is completed through the feed selector switch 250 to line 236. Accordingly, relay FR is energized momentarily at each limit of table motion. The feed relay FR, provides the feed steps to the rail head or tool slide.

Relay FR actuates the contact FRC of the power circuit to control the single cycle feed clutch 41. The feed motor 25 is energized continuously while the machine is in operation and the single cycle feed clutch 41 provides one feed step each time relay FR is energized momentarily by the limit switches. As indicated, the clutch 41 includes a release lever 251, which normally resides in the arresting position shown. The release lever is lifted by the solenoid 252, which is energized by the branch power line 253 each time contact FRC momentarily is closed. Thus, each time one of the limit switches is tripped, the clutch element begins to rotate since the limit switch opens immediately, the lever 251 is lifted momentarily to release the clutch. However, as soon as the clutch begins to rotate, the lever drops to the position to arrest it after one cycle of rotation.

As explained earlier with reference to the cross rail transmission 31, the single cycle clutch feeds the rail head 11 horizontally or the tool slide 17 vertically, depending upon which control lever is in feed position (levers 32 or 33, Figure 11). It will be understood that the direction of feed depends upon the position of the levers and that the amount of the feed step depends upon the setting of feed dial 34 (Figure 1).

At the limits of table movement, the tool motor 18 shifts the rocking tool shaft 13 to reposition the cutting bits as explained earlier. The tool motor is controlled by the cutting tool relay CT (cutting tool), which is energized when the limit switches of the table (or rail head) are tripped. This relay actuates the motor contacts CT–R and CT–L which energize the tool motor in right and left directions. It will be noted that contacts CT–L normally are closed, thus energizing the motor in one direction when the cutting tool relay CT is deenergized. The direction of rotation of the tool motor and cutting tool is related to the limit switches to rotate the cutting tool to the positions indicated diagrammatically in Figures 16 and 17. The tool motor preferably is energized continuously during the cutting strokes to hold the cutting tool firmly in position in both directions, as noted earlier.

Relay CT (cutting tool) is energized by the contact TRC in line 254. The TRC contact is actuated by the right table relay TR. When the left table limit switch 42 is tripped to energize relay TR (table right), the TRC contact energizes relay CT, which closes the tool motor contacts CT–R (cutting tool right). At the same time, the normally closed contacts CT–L (cutting tool left) are opened. This shifts the cutting tool to a position to cut during table movement toward the right (bit 15 Figure 16).

When the table reaches its right hand limit of travel and trips right limit switch 43, then the normally closed holding contact TRC (line 246) opens and deenergizes relay TR (table right). Upon being deenergized, relay TR opens the contact TRC of line 254. This deenergizes cutting tool relay CT and thereby opens motor contacts CT–R, at the same time closing motor contacts CT–L. This shifts the tool motor and cutting tool for cutting during left table movement (bit 16 Figure 17). As explained below, the relay HR (rail head right) actuates a second contact HRC in the circuit of the cutting tool relay CT to shift the cutting tool in the same manner during cross planing.

*Cross planing circuit*

When the table selector switch 238 (longitudinal planing) is opened and the cross planing switch 240 is closed, the table relays TR and TL are deenergized and the rail head relays HR and HL (head right and head left) are placed in the circuit. These relays are controlled by the rail head limit switches 47 and 48 (Figure 19). The relays HR and HL actuate the motor contacts HRC and HLC to operate the power traverse motor 26 for right and left movement of the rail head 11.

During the cross planing operation, the rail head lever 33 is shifted to couple the vertical power shaft 36 to the rail screw 21. This connects the power traverse motor 26 to the rail screw 21.

At the left limit of rail head travel (Figure 19), the left limit switch 47 is tripped to energize relay HR for rail head movement to the right. A holding circuit 255, includes the normally closed contact HLC, actuated by the HL relay (head left) and also, the contact HRC of the HR relay, shunts the limit switch 47. The holding circuit keeps the relay HR energized during movement of the rail head toward the right.

It will be noted that the HR relay (head right) actuates the HRC contact in line 257 to energize the cutting tool relay CT when relay HR is energized. This closes the contacts CT–R of the tool motor 18 to position the tool for cutting during right hand motion of the rail head. When the right limit switch 48 is tripped at right hand limit of rail head travel, then relay HR is deenergized by way of normally closed HLC contact in the holding circuit 255. Therefore, the HRC contact in line 257 to the cutting tool relay CT is opened at the right limit of head travel. This deenergizes relay CT to open the CT–R contacts and to close the CT–L contacts for reversal of the cutting tool.

As noted above with respect to the table limit switches, the cross rail limit switches 47 and 48 also include contacts 247 connected to line 248 for energizing the feed relay FR at the limits of rail head travel. Accordingly, the single cycle clutch 41 is energized to impart feed motion if its selector switch 250 is closed. During cross-planing, selector switch 250 may be closed to impart downward feed motion to the cutting tool, for example, in a slotting operation. In this case the tool slide feed rod 22 is coupled to the feed motor by shifting the tool slide control lever 32 of the rail transmission to feed position.

In summary, it will be observed that, during longitudinal planing, the table is reciprocated by the table motor 38 under control of the table limit switches 42 and 43 and that the feed relay FR and cutting tool relay CT provide the feed and the cutting tool reversal at the limits of travel. If feed (rail head or tool slide) or tool reversal are not required, than the selector switches 250 or 258 are opened. In cross planing, the same operations occur at the limits of rail head travel (power traverse motor 26), depending upon the position of the selector switches for feed and tool reversal.

To provide rapid traverse of the rail head, or tool slide, the rapid traverse switches 260 and 261 of the cross rail transmission, are tripped upon movement to traverse position of the control levers 32 or 33. These switches are shown in shunt with the rail limit switches 47 and 48 by the dotted lines 262—262. The switches 260 or 261 energize the right or left head relays HR and HL to operate the power traverse motor 26 in forward or reverse direction upon movement of either lever to traverse position (Figure 11). As explained above, the two levers couple the rail head or its tool slide to the rapid traverse motor 26. Therefore, either lever may be shifted to the traverse limits indicated above to trip the switches 260 or 261 for traversing the rail head or tool slide in either direction. These traverse movements (rail head and tool slide) are imparted independently of the control system.

Having described our invention, we claim:

1. In a planer having a saddle, a tool head comprising a clapper box swivelled on the saddle, said clapper box adapted to mount a cutting tool and being shiftable to a cutting or non-cutting position, a tool support shaft rotatably mounted in the tool head between the clapper box and the saddle, a reversible stall motor mounted on the tool head in driving connection with the said tool support shaft for rocking the tool shaft through an arc of oscillation, and driving means interconnecting the clapper box and tool support shaft for shifting the clapper box to said cutting and non-cutting positions upon rocking motion of the tool shaft alternately to the limits of said arc of oscillation, a tool block demountably carried by said tool shaft in a position generally beyond the extremity of the said tool head, the said tool block being adapted to receive and support cutting bits facing generally in opposite direction and displaced outwardly from the periphery of the tool shaft, and positive stop means co-acting with said tool support shaft at each end of its arc of oscillation for sustaining the torque load exerted thereon by said tool block when cuts are being taken by the respective tool bits thereon.

2. In a planer having a saddle, a tool head comprising a clapper box swivelled on the saddle, said clapper box adapted to mount a cutting tool and being shiftable to a cutting or non-cutting position, a tool supporting shaft mounted for oscillation about its longitudinal axis in said tool head intermediate the clapper box thereof and the said saddle, co-acting stop means carried respectively by said tool supporting shaft and said head for limiting the oscillation of said tool supporting shaft through a predetermined arc, and means interconnecting the tool-supporting shaft and clapper box for shifting the clapper box to a cutting position at one limit of oscillation of the tool supporting shaft and to a non-cutting position at the opposite limit thereof, cutting tool members associated with said tool supporting shaft in a position beyond the endwise portion of said tool head, the said cutting tool members facing generally in opposite directions but occupying relatively the same position when the tool supporting shaft is oscillated respectively to the limits of its arc of oscillation, whereby the said tool cutting bits alternately are positioned to exert a cut upon a work piece carried back and forth past the said cutting bits.

3. A double-acting cutting mechanism for a machine tool having a tool slide, work support and a reversible power means for moving the work support in forward and reverse directions along a cutting plane, said double-acting cutting mechanism comprising, an oscillating tool mounting shaft rotatably mounted on the tool slide, a cutting tool mounted on the tool shaft, the cutting tool having opposed cutting edges displaced outwardly from the axis of the tool shaft and residing in a common plane of oscillation, the said axis being generally perpendicular to the said line of relative motion of the work support, the said axis being inclined in a second plane related generally at right angles to said line of motion, whereby the common plane of oscillation of said cutting edges is inclined relative to the said cutting plane, the cutting edges being spaced radially from one another in said common plane of oscillation and residing on opposite sides of said second plane, the said inclined plane of oscillation passing through the cutting plane between the radially spaced cutting edges, a reversible tool motor mounted on the tool slide, a crank element connected to the said motor and movable by said motor in forward and reverse directions through an arc, a lever extending from the tool shaft, a link pivotally connecting the crank element to said lever, yieldable means interposed in said link, said yieldable means providing over-travel of the crank element at the limits of motion thereof, thereby to preload the tool mounting shaft at the limits of oscillation thereof whereby the motor oscillates the tool shaft to present the opposed cutting edges alternately to said cutting plane, and a pair of limit switches connected to the tool motor for energizing the motor in forward and reverse directions, said switches mounted in positions to be engaged and actuated by the work support at the forward and reverse limits of travel thereof, the inclined plane of oscillation of the cutting edges shifting the non-cutting edge outwardly from said cutting plane.

4. A duplex cutting mechanism for a machine tool having a tool slide, work mounting means, reversible power means for moving the work mounting means lineally in forward and reverse cutting strokes along a cutting plane, said duplex cutting mechanism comprising, a tool shaft rotatably mounted on the tool slide, a pair of opposed rough cutting tools mounted on the tool shaft, the cutting tools displaced outwardly from the axis of the tool shaft and residing in a common plane of oscillation, the tool shaft being generally perpendicular to the line of motion of the work mounting means, the opposed cutting tools located to be shifted alternately to cutting positions relative to the cutting plane upon forward and reverse oscillation of the tool shaft, a clapper pivotally mounted on the tool slide on a pivotal axis residing generally at right angles to the said line of motion of the cutting strokes, the clapper being movable in an arc of motion, the line of motion of the work mounting means being in the plane of said arc, the clapper having a finish cutting tool movable relative to said cutting plane to cutting and non-cutting positions, a reversible tool motor connected to the tool shaft, a clapper actuating means connecting the clapper to the tool shaft for swinging the clapper alternately to said cutting and non-cutting positions, the tool motor oscillating the tool shaft and opposed cutting tools alternately to cutting positions relative to said cutting plane and concurrently shifting the clapper and finish cutting tool thereof alternately to cutting and non-cutting positions to provide rough cutting during both of said strokes and finish cutting during the stroke in one direction.

5. A duplex cutting mechanism for a machine tool having a tool slide, work mounting means, reversible power means for moving the work mounting means lineally in forward and reverse cutting strokes along a cutting plane, said duplex cutting mechanism comprising, an oscillating tool shaft rotatably mounted on the tool slide, a pair of opposed rough cutting tools mounted on said shaft and displaced outwardly from the axis thereof, the tool shaft being generally perpendicular to the line of motion of the work mounting means in one plane, the axis being inclined transversely in a second plane generally right angular to said line of motion, the cutting tools residing in a common plane of oscillation which is inclined relative to said cutting plane, a clapper pivotally mounted on the tool slide on a pivotal axis residing generally at right angles to the said line of motion, the clapper being movable in an arc of motion, the line of motion of the work mounting means being in the plane of said arc, the clapper having a finish cutting tool movable to and from said cutting plane to cutting and non-cutting positions, a reversible tool motor on the tool slide connected to the tool shaft, a clapper actuating means connecting the tool shaft to the clapper for swinging the clapper alternately to said cutting and non-cutting positions, the tool motor oscillating the tool shaft and rough cutting tools alternately to cutting position in said inclined plane of oscillation to shift one tool to cutting position and to lift the opposed tool from said cutting plane, the tool motor concurrently shifting the clapper and finish cutting tool thereof alternately to cutting and non-cutting positions at opposite limits of the cutting strokes to provide rough cutting during both strokes and finish cutting during one stroke.

6. A duplex cutting mechanism for a machine tool having a tool slide, work mounting means, reversible power means for moving the work mounting means lineally in forward and reverse cutting strokes along a cutting plane, said duplex cutting mechanism comprising, an oscillating tool shaft rotatably mounted on the tool slide, a pair of opposed rough cutting tools mounted on said shaft and displaced outwardly from the axis thereof, the tool shaft being generally perpendicular to the line of motion of the work mounting means in one plane, the axis being inclined transversely in a second plane generally right angular to said line of motion, the cutting tools residing in a common plane of oscillation which is inclined relative to said cutting plane, a clapper pivotally mounted on the tool slide on a pivoted axis residing generally at right angles to the said line of motion, the clapper being movable in an arc of motion the line of motion of the work mounting means being in the plane of said arc, the clapper having a finish cutting tool movable to and from said cutting plane to cutting and non-cutting positions, a reversible tool motor on the tool slide connected to the tool shaft, clapper actuating means connecting the tool shaft to the clapper for swinging the clapper alternately to said cutting and non-cutting positions, the tool motor oscillating the tool shaft and rough cutting tools alternately to cutting position in said inclined plane of oscillation to shift one tool to cutting position and to lift the opposed tool from said cutting plane, the tool motor concurrently shifting the clapper and finish cutting tool thereof alternately to cutting and non-cutting positions at opposite limits of the cutting strokes to provide rough cutting during both strokes and finish cutting during one stroke, and feed means connected to the tool slide advancing the same stepwise across the cutting plane at opposite limits of the cutting strokes, thereby to feed the rough cutting tools and finish cutting tool in unison across the cutting plane.

7. A double-acting cutting mechanism for a machine tool having a tool slide, a work support, and a power motor for moving the work support in forward and reverse cutting strokes along a cutting plane, said double-acting cutting mechanism comprising, a rocking tool shaft rotatably mounted on the tool slide, the axis of said shaft being generally perpendicular to the line of movement of the work support, a double-cutting tool mounted on the tool shaft having a pair of opposed cutting edges displaced outwardly from the axis of the tool shaft, a reversible tool motor on the tool slide connected to the tool shaft for oscillating the tool shaft, control means energizing the power motor and tool motor in forward and reverse directions in time with one another, a gear connected to the tool motor, a crank element on said gear for arcuate motion in forward and reverse directions about the axis of the gear upon operation of the tool motor in forward and reverse directions, a lever secured to the tool shaft, a link connecting the crank to the lever for oscillating the tool shaft upon said arcuate motion of the crank, yieldable means interposed between the link and lever of the tool shaft, said yieldable means providing over-travel of said crank at the limits of motion thereof, thereby to preload the rocking tool shaft at the limits of oscillation thereof, a stop projecting from the tool shaft, a pair of spaced stops mounted on the tool slide in position to be engaged by said stop at the limits of oscillation, the said cutting edges being spaced apart along a line generally parallel to the line of movement of the work support, the opposed cutting edges alternately facing in the direction of motion of the work support upon alternate oscillations of the tool shaft, the stop locating the said cutting edges alternately in cutting position and resisting the cutting force acting on the respective cutting edges tending to rotate the tool shaft during the cutting operation.

8. A double-acting cutting mechanism for a metal working planer, said mechanism comprising, a tool head having an oscillating tool shaft, a double-acting tool mounted on the shaft, the cutting tool having opposed cutting edges which are alternately presented to cutting position upon oscillation of the tool shaft in forward and reverse directions, a reversible tool motor mounted on the tool head, a motor gear mounted on the shaft of the motor, a stop arm secured to the motor shaft, a stop means on the tool head engageable by the stop arm to limit the motor gear to less than one revolution upon operation of the motor in forward and reverse directions, a reduction gear journalled on the tool head and meshing with the motor gear, a crank element on the reduction gear, a yieldable driving connection from said crank element to the tool shaft for oscillating the shaft upon partial rotation of the reduction gear and crank element, means connected to the motor for energizing the same in forward and reverse directions thereby to oscillate the tool shaft, a movable stop on the tool shaft, a pair of co-acting stationary stops mounted on the tool head, the stationary stop elements spaced apart from one another and engageable by the movable stop to limit the forward and reverse oscillation of the tool shaft, the spacing of the stationary stops providing an arc of shaft oscillation which is less than the limit of motor gear rotation provided by the said stop arm, whereby the movable stop of the tool shaft engages the stationary stops before said stop arm engages the stationary stop means of the tool head to provide over-travel of the crank element at the limits of oscillation, said over-travel causing the yieldable driving connection to yield and apply preload torque to the tool shaft at the limits of oscillation thereof.

9. A double-acting cutting mechanism for a metal working planer, said mechanism comprising, a tool head having an oscillating tool shaft, a double acting tool mounted on the tool shaft, the cutting tool having opposed cutting edges which are alternately presented to cutting position upon oscillation of the tool shaft in forward and reverse directions, a reversible tool motor mounted on the tool head, a motor gear on the shaft of said motor, a stop arm secured to the motor shaft, stop means on the tool head engageable by the stop arm to limit the motor gear to less than one revolution upon operation of the motor in forward and reverse directions, a reduction gear journalled on the tool head and meshing with the motor gear, a crank on the reduction gear, a lever mounted on the tool shaft, a link having an end pivotally connected to said crank, a yieldable element on the outer end portion of said lever, the link having an opposite end pivotally connected to the yieldable element, means connected to the tool motor for energizing the same in forward and reverse directions, thereby to oscillate the tool shaft, a movable stop on the tool shaft, a pair of coacting stationary stops mounted on the tool head, the stationary stops spaced apart from one another and engageable by the movable stop to limit the forward and reverse oscillation of the tool shaft, the spacing of the stationary stops providing an arc of shaft oscillation which is less than the limit of motor gear rotation provided by the said stop arm, whereby the movable stop of the tool shaft engages the stationary stops before said stop arm engages the stop means of the tool head, to provide over-travel of the crank at the limits of oscillation, said over-travel causing said yieldable element to yield and apply preload torque to the tool shaft at the limits of oscillation thereof.

10. A double-acting cutting mechanism for a metal working planer comprising, a tool head having an oscillating tool shaft journalled therein, the tool shaft having a double cutting tool including opposed cutting edges which are alternately shifted to cutting position upon oscillation of the shaft, a reversible tool motor on the tool head, control means connected to the motor for energizing the same in forward and reverse directions, a motor gear mounted on the shaft of the motor, a stop arm mounted on the shaft of the motor, a stop means on the tool head engageable by the stop arm at opposite limits of motor operation to limit the motor gear to less than one revolution, a reduction gear journalled on the tool head and meshing with the motor gear, a crank element on said reduction gear, a lever on tool shaft, a driving clevis pivotally mounted on the outer end of said lever, a link having an end pivotally connected to the swinging end of the driving clevis and having an opposite end pivotally connected to the crank element for oscillating the tool shaft, spring means on the lever engaging the driving clevis, the spring means providing movement of the clevis relative to the lever in the direction of link movement, a movable stop on the tool shaft, a pair of spaced stationary stops on the tool head engageable with the movable stop to limit the oscillation of the shaft, the stationary stops located to engage the movable stop in advance of the engagement of the said stop arm and stop means at opposite limits of motor gear rotation thereby providing over-travel of the link, said spring means yielding to provide movement of the driving clevis beyond the limits of tool shaft oscillation to apply preload torque to the shaft at the limits of oscillation, said preload torque locking the cutting tool rigidly in said alternate cutting positions to resist tool chatter during the cutting stroke.

References Cited in the file of this patent

UNITED STATES PATENTS

| | | |
|---|---|---|
| 1,215,514 | Frede | Feb. 13, 1917 |
| 1,236,005 | Pittman | Aug. 7, 1917 |
| 1,466,062 | Rhodes | Aug. 28, 1923 |
| 1,516,186 | Hagman et al. | Nov. 18, 1924 |
| 1,518,707 | Sleeper | Dec. 9, 1924 |
| 2,015,919 | Brunner | Oct. 1, 1935 |
| 2,047,052 | Benzon | July 7, 1936 |
| 2,074,257 | Ernst et al. | Mar. 16, 1937 |
| 2,105,237 | Welch | Jan. 11, 1938 |
| 2,221,584 | King | Nov. 12, 1940 |
| 2,252,655 | Young | Aug. 12, 1941 |
| 2,317,674 | Daugherty | Apr. 27, 1943 |
| 2,412,337 | Jackson | Dec. 10, 1946 |
| 2,432,020 | Laesser | Dec. 2, 1947 |
| 2,475,577 | Berthiez | July 5, 1949 |
| 2,543,661 | Edlich et al. | Feb. 27, 1951 |

FOREIGN PATENTS

| | | |
|---|---|---|
| 1,063,929 | France | Dec. 23, 1953 |